(12) United States Patent
Jung

(10) Patent No.: US 10,004,095 B2
(45) Date of Patent: Jun. 19, 2018

(54) METHOD AND APPARATUS FOR COMMUNICATING USING MULTIPLE FREQUENCY BANDS

(71) Applicant: Samsung Electronics Co., Ltd., Gyeonggi-do (KR)

(72) Inventor: Bu-Seop Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/603,539

(22) Filed: May 24, 2017

(65) Prior Publication Data

US 2018/0014341 A1    Jan. 11, 2018

(30) Foreign Application Priority Data

Jul. 6, 2016  (KR) ......................... 10-2016-0085611

(51) Int. Cl.
*H04W 76/02*  (2009.01)
*H04W 8/00*  (2009.01)
(Continued)

(52) U.S. Cl.
CPC ......... *H04W 76/023* (2013.01); *H04W 8/005* (2013.01); *H04W 56/002* (2013.01);
(Continued)

(58) Field of Classification Search
CPC ............. H04W 52/143; H04W 52/241; H04W 52/285; H04W 68/005; H04W 8/005; H04B 1/7156
See application file for complete search history.

(56) References Cited

U.S. PATENT DOCUMENTS 9,872,234 B2 * 1/2018 Huang .................. H04W 48/16
2012/0276938 A1  11/2012 Wagholikar et al.
(Continued)

FOREIGN PATENT DOCUMENTS

KR    10-2011-0092938 A    8/2011
KR    10-2014-0031261 A    3/2014
(Continued)

OTHER PUBLICATIONS

International Search Report, Dated: Sep. 12, 2017.

*Primary Examiner* — Bobbak Safaipour
(74) *Attorney, Agent, or Firm* — Cha & Reiter, LLC

(57) ABSTRACT

Various exemplary embodiments of the present disclosure disclose a method and an apparatus for communicating by using multiple frequency bands of an electronic device in a wireless communication system. The electronic device comprises: a first wireless communication circuit configured to perform wireless communication with at least one external electronic device by using a first frequency band; a second wireless communication circuit configured to perform wireless communication with the at least one external electronic device by using a second frequency band; and a processor functionally connected with the first wireless communication circuit and the second wireless communication circuit. The processor is configured to establish a wireless connection with the at least one external electronic device based on the first frequency band by using the first wireless communication circuit; determine whether it is possible to establish a wireless connection with the at least one external electronic device based on the second frequency band by using the second wireless communication circuit, during establishment of the wireless connection with the at least one electronic device based on the first frequency band; when it is not possible to establish a wireless connection with the at least one external electronic device based on the second
(Continued)

frequency band according to the determining, perform data communication with the at least one external electronic device based on the first frequency band; and when it is possible to establish a wireless connection with the at least one external electronic device based on the second frequency band, perform data communication with the at least one external electronic device based on the second frequency band.

17 Claims, 16 Drawing Sheets

(51) Int. Cl.
    *H04W 56/00* (2009.01)
    *H04W 76/04* (2009.01)
    *H04W 76/06* (2009.01)
    *H04W 88/06* (2009.01)

(52) U.S. Cl.
    CPC ....... *H04W 76/046* (2013.01); *H04W 76/064* (2013.01); *H04W 88/06* (2013.01)

(56) References Cited

U.S. PATENT DOCUMENTS

| | | |
|---|---|---|
| 2014/0269763 A1 | 9/2014 | Gantman et al. |
| 2014/0369213 A1 | 12/2014 | Kim et al. |
| 2015/0103740 A1 | 4/2015 | Emmanuel et al. |
| 2015/0163828 A1 | 6/2015 | Vandwalle et al. |
| 2016/0150501 A1* | 5/2016 | Hui ...................... H04B 1/7156 370/254 |
| 2016/0286574 A1* | 9/2016 | Abraham ............... H04L 63/065 |
| 2016/0353269 A1* | 12/2016 | Kasslin .................. H04W 8/005 |
| 2017/0034769 A1* | 2/2017 | Kim ....................... H04W 48/08 |
| 2017/0111849 A1* | 4/2017 | Park ....................... H04W 48/08 |
| 2017/0280377 A1* | 9/2017 | Patil ....................... H04W 48/16 |

FOREIGN PATENT DOCUMENTS

| | | |
|---|---|---|
| KR | 10-2014-0146862 A | 12/2014 |
| KR | 10-2015-0132240 A | 11/2015 |
| WO | 2015-026921 A2 | 2/2015 |
| WO | 2016-069145 A1 | 5/2016 |

* cited by examiner

METHOD AND APPARATUS FOR COMMUNICATING USING MULTIPLE FREQUENCY BANDS

CLAIM OF PRIORITY

The present application is related to and claims priority under 35 U.S.C. § 119 to an application filed in the Korean Intellectual Property Office on Jul. 6, 2016 and assigned Serial No. 10-2016-0085611, the contents of which are incorporated herein by reference.

TECHNICAL FIELD

Various exemplary embodiments of the present disclosure relate to a method and an apparatus for communicating using multiple frequency bands of an electronic device in a wireless communication system.

BACKGROUND

With the recent enhancement of digital technology, various types of electronic devices, such as mobile communication terminals, smart phones, tablet personal computers (PCs), notebooks, wearable devices, digital cameras, personal computers, or the like, are widely used.

SUMMARY

Various exemplary embodiments provide a method and an apparatus for communicating between electronic devices by efficiently utilizing multiple frequency bands in an electronic device, which is able to support multiple frequency bands.

Various exemplary embodiments also provide a method and an apparatus which can efficiently manage short-range communication and/or long-range communication by utilizing different frequency bands simultaneously, and accordingly, can enhance data transmission efficiency.

According to an aspect of the present disclosure, an electronic device comprises: a first wireless communication circuit configured to perform wireless communication with at least one external electronic device by using a first frequency band; a second wireless communication circuit configured to perform wireless communication with the at least one external electronic device by using a second frequency band; and a processor functionally connected with the first wireless communication circuit and the second wireless communication circuit. The processor is configured to establish a wireless connection with the at least one external electronic device based on the first frequency band by using the first wireless communication circuit; determine whether it is possible to establish a wireless connection with the at least one external electronic device based on the second frequency band by using the second wireless communication circuit, during establishment of the wireless connection with the at least one electronic device based on the first frequency band; when it is not possible to establish a wireless connection with the at least one external electronic device based on the second frequency band according to the determining, perform data communication with the at least one external electronic device based on the first frequency band; and when it is possible to establish a wireless connection with the at least one external electronic device based on the second frequency band, perform data communication with the at least one external electronic device based on the second frequency band.

According to another aspect of the present disclosure, a method for operating of an electronic device, the method comprises establishing a wireless connection with at least one external electronic device using a first frequency band; determining whether a wireless connection with the at least one external electronic device can be establish using a second frequency band during establishment of the wireless connection with the at least one external electronic device using the first frequency band; when it is not possible to establish a wireless connection with the at least one external electronic device based on the second frequency band according to the determining, performing data communication with the at least one external electronic device based on the first frequency band; and when it is possible to establish a wireless connection with the at least one external electronic device based on the second frequency band, performing data communication with the at least one external electronic device based on the second frequency band.

According to another aspect of the present disclosure, a computer readable recording medium has a program recorded thereon, for executing the above-described method in a processor.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
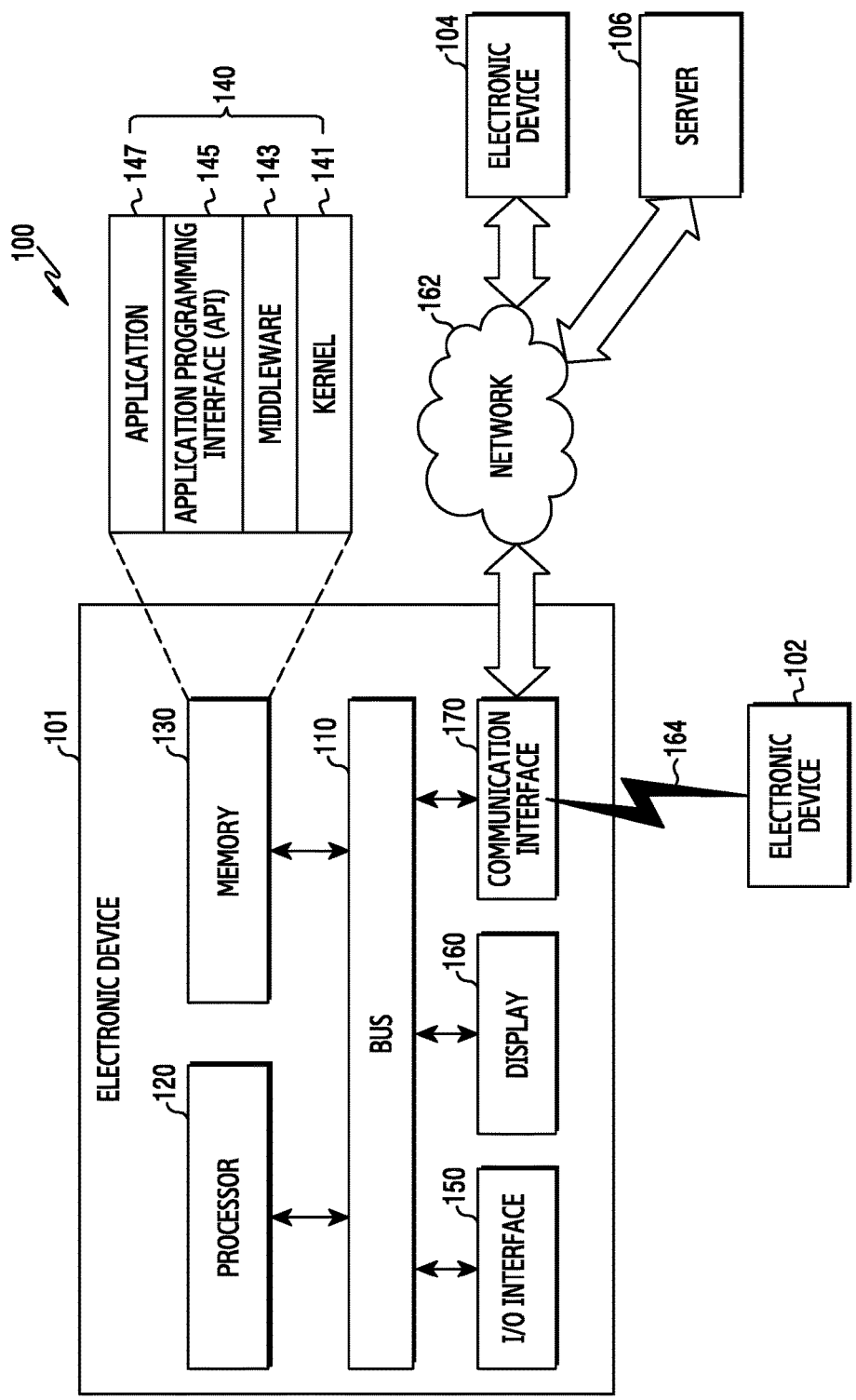
FIG. 1 is a view showing a network environment including an electronic device according to various exemplary embodiments of the present disclosure.

Hereinafter, embodiments of the present disclosure will be explained with reference to the accompanying drawings. However, the present disclosure is not limited to the specific embodiments herein and should be construed as including various modifications, equivalents and/or alternatives of the embodiments of the present disclosure described herein. In the drawings, similar reference numerals may be used for similar elements, steps, components, or the like. The terms of a singular form may include plural forms unless otherwise specified The terms "A or B" or "at least one of A or/and B" used in the present disclosure include all possible combinations of the items enumerated therewith. The terms such as "first" and "second" may be used in embodiments of the present disclosure to mark/identify/label various elements regardless of the order and/or importance of the elements, and do not limit the marked/identified/labelled elements in any way. These terms are used to distinguish one element from another. It will be understood that, when an element (for example, a first element) is mentioned as being "operatively or communicatively coupled with/to" or "connected to" another element (for example, a second element), the element may be directly coupled or connected to another element, or there may be an intervening element (for example, a third element) between the element and another element.

The term "configured (or set) to . . . " used in the embodiments may be interchangeably used with the terms "suitable for . . . ," "having the capacity to . . . ," "adapted to . . . ," "made to . . . ," "capable of . . . ," or "designed to" depending on the situation. The term "configured (or set) to . . . " does not necessarily mean "specifically designed to . . . " in a hardware level. Instead, in a certain situation, the term "a device configured to . . . " may refer to a situation in which "the device being capable of . . . " with another device or parts. For example, "a processor configured (set) to perform A, B, and C" may refer, for example, to a dedicated processor (for example, an embedded processor) for performing a corresponding operation, or a generic-purpose processor (for example, a central processing unit (CPU) or an application processor (AP)) for performing corresponding operations by executing one or more software programs stored in a memory device.

The term "connected" or "connection" shall also be understood to include a temporary sharing or association of transmission channels, including radio frequency channels, to provide for the transmission of information between two points. The term "wireless connection" shall be understood to include a temporary sharing or association of radio frequency channels to provide for the transmission of information between two points.

Electronic devices can include communication circuits that are capable of wireless communication over a variety of different frequency bands. Lower frequency bands are usually associated with higher ranges but lower bit rates. High frequency bands can allow for higher data rates, but have lower ranges. For example, WiFi (802.11ac) commonly operates in the 2.4/5 GHz frequency band, has a range of as high as 250 m/825 ft and a data rate of as high as 433 Mbps, while WiGig (802.11ad) operates in the 60 GHz band, has a data rate as high as 4.6 Gbps, but with a range of only 10-30 m/30-100 ft which cannot penetrate walls.

Development of various proximity services utilizing low-power discovery technology using short-range communication technology is ongoing. Low-power and proximity-based advertisement services using Bluetooth low energy (BLE) beacons are a representative example of such technology.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram of an electronic device 101 communicating using multiple frequency bands with an external electronic device 102. The electronic device 101 can establish a wireless connection with the external electronic device 102 using a first frequency band. When it is possible for the electronic device 101 to establish a wireless connection with the external electronic device 102 using a second frequency band, the electronic device 101 and the external electronic device may perform data communication using the second frequency band. However, when it is not possible to establish a connection with the at least one external electronic device using the second frequency band, the electronic device 101 can perform data communication with the external device 102 using the first frequency band.

The electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

According to certain embodiments, the communication interface 170 can comprise a first communication circuit configured to perform wireless communication with the external electronic device 102 using a first frequency band, and a second communication circuit configured to perform wireless communication with the external electronic device 102 using a second frequency band.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101. A processing (or controlling) operation of the processor 120 according to various exemplary embodiments will be described below in detail with reference to the accompanying drawings.

According to certain embodiments, the processor 120 cause the first wireless communication circuit of the communication interface 170 to establish a wireless connection with the external electronic device 102 using the first frequency band. The processor 120 can determine whether it is possible to establish a wireless connection with the external electronic device 102 using the second frequency band and the second wireless communication circuit of the communication interface 170.

In one embodiment, the electronic device 101 and the external electronic device 102 can exchange synchronization information using the first frequency band. The synchronization information can include, for example, an identification of a discovery channel and a discovery window. The processor 120 can determine whether it is possible to establish the wireless connection with the external electronic device 102 based on the synchronization information.

The electronic device 101 can establish a Wi-Fi Neighbor Awareness Networking (NAN) cluster for the second frequency band using the discovery channel and discover window. NAN clusters are used to discover other devices using a low power. During the discovery window, the devices can use the discovery channel to exchange service discovery frames. From the foregoing, the electronic device 101 can determine whether communication using the second frequency band is possible.

Alternatively, the first device can determine whether it is possible to communicate with the second device using the second frequency band by performing discovery in the second frequency band. For example, many peer-to-peer standards such as WiFi P2P or WiGig P2P, define a discovery procedure for discovering peers.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The memory 130 may store one or more programs which are executed by the processor 120 and may perform a function of temporarily storing inputted/outputted data. According to various exemplary embodiments, the memory 130 may serve to store acquired data, and may store data acquired in real time in a temporary storage device and may store data determined as being stored in a storage device which can store for a long time. The memory 130 may include a computer-readable recording medium having a program recorded thereon, for executing methods according various exemplary embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device. For example, the input/output interface 150 may include a wire/wireless headphone port, an external charger port, a wire/wireless data port, a memory card port, an audio input/output port, a video input/output port, an earphone port, or the like.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The display 160 may show a visual output to the user, for example. The visual output may be displayed in the form of a text, a graphic, or a video or a combination thereof. The display 160 may display (output) a variety of information processed in the electronic device. For example, the display 160 may display a user interface (UI) or a graphic user interface (GUI) related to the use of the electronic device.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol.

According to one embodiment, the wireless communication may include, for example, at least two of wireless fidelity (WiFi), wireless gigabit alliance (WiGig), Bluetooth, Bluetooth low energy (BLE), Zigbee, near field communication (NFC), magnetic secure transmission, radio frequency (RF), or a body area network (BAN).

According to one embodiment, the wireless communication may include a global navigation satellite system (GNSS). For example, the GNSS may be a global positioning system (GPS), a global navigation satellite system (Glonass), a Beidou navigation satellite system (hereinafter, referred to as "Beidou"), Galileo, or the European global satellite-based navigation system. Hereinafter, the "GPS" and the "GNSS" may be used interchangeably. The wire communication may include, for example, at least one of a universal serial bus (USB), a high definition multimedia interface (HDMI), a recommended standard 232 (RS-232), power line communication, or a plain old telephone service (POTS).

The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers.

According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
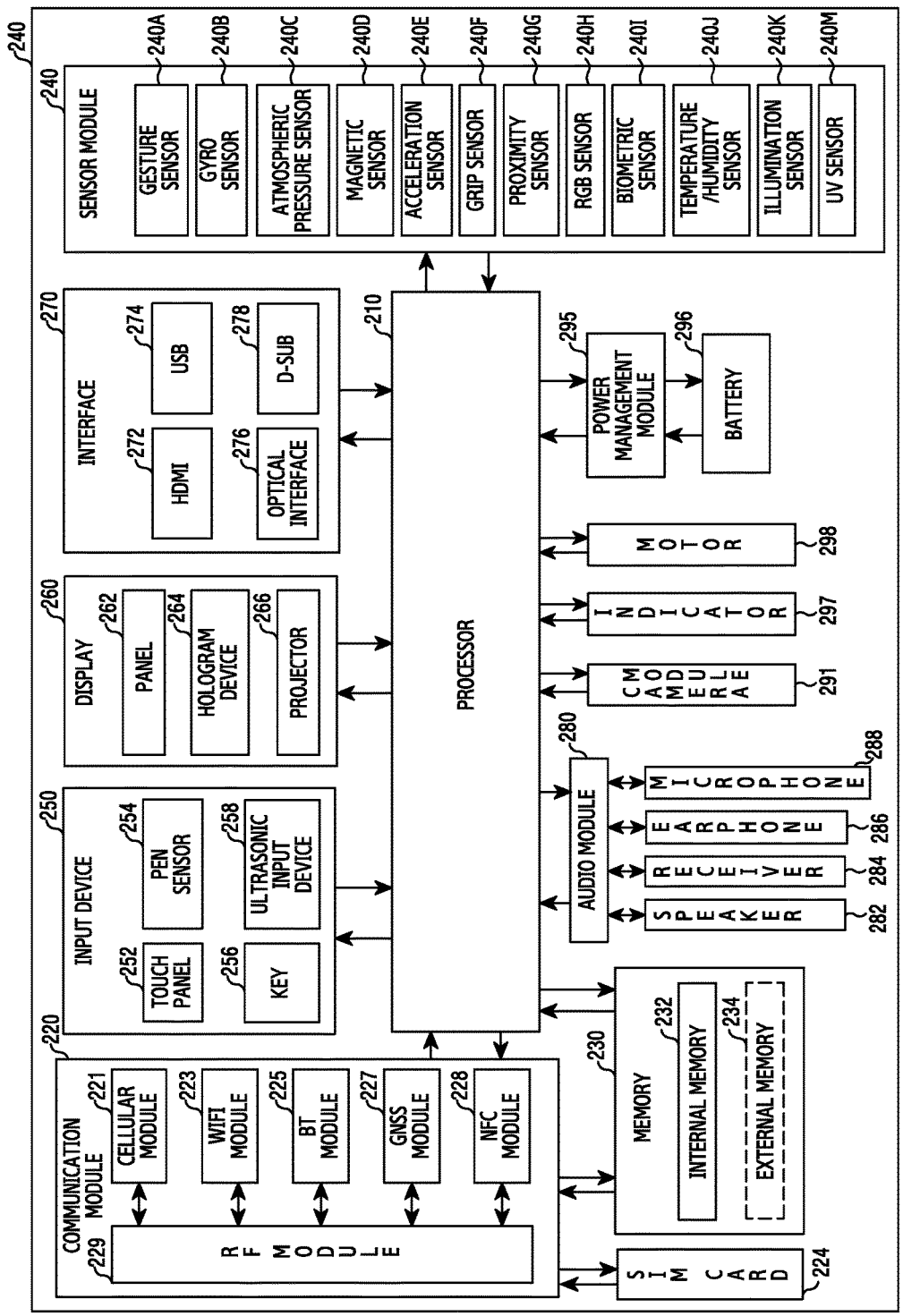
FIG. 2 is a block diagram of an electronic device according to various exemplary embodiments of the present disclosure.

The server 106 may include, for example, at least one of a certification server, an integration server, a provider server (or a mobile network operator server), a content server, an Internet server, a cloud server, or the like FIG. 2 is a block diagram of an electronic device according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory. A processing (or controlling) operation of the processor 210 according to various exemplary embodiments will be described in detail with reference to the accompanying drawings.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229. Although not shown, the communication module 220 may further include a WiGig module (not shown) and an 802.11ah module (not shown), for example. According to one embodiment, the WiFi module 223, the WiGig module (not shown) and the 802.11ah (not shown), may be integrated into a single chip.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP). According to an exemplary embodiment, at least some (for example, two or more) of the cellular module 221, the WiFi module 223, the Bluetooth module 225, the GNSS module 227, or the NFC module 228 may be included in a single integrated chip (IC) or an IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

For example, the WiFi module 223 may indicate a module for wirelessly accessing the Internet and establishing a wireless LAN link with other external devices (for example, another electronic device 102 or the server 106). The WiFi module 223 may be embedded in the electronic device 201 or may be provided outside the electronic device 201. The wireless Internet technology may use WiFi, WiGig, Wibro, world interoperability for microwave access (WiMax), high speed downlink packet access (HSPDA), millimeter Wave (mmWave), or the like. The WiFi module 223 may interwork with another external device (for example, another electronic device 104 or the like) connected with the electronic device via a network (for example, a wireless Internet network) (for example, the network 162) to transmit various data of the electronic device to the outside or receive data from the outside. The WiFi module 223 may always maintain an on-state or may be turned on/off according to settings of the electronic device or a user input.

The Bluetooth module 225 and the NFC module 228 may indicate, for example, short-range communication modules for performing short range communication. The short-range communication technology may use Bluetooth, BLE, radio frequency identification (RFID), infrared data association (IrDA), ultra wideband (UWB), Zigbee, or NFC. The short-range communication module may interwork with another external device (for example, another electronic device 102) connected with the electronic device via a network (for example, a short-range communication network) to transmit various data of the electronic device to the external device or receive data therefrom. The short-range communication module may always maintain an on-state or may be turned on/off according to settings of the electronic device or a user input.

In certain embodiments, the Wifi module 223 can be configured to perform wireless communication with at least one external electronic device using, for example, the 2.4 GHz/5 GHz frequency band. A WiGig module (not shown) can be configured to perform wireless communication with the at least one external device using the 60 GHz frequency band.

The processor 210 can cause the Wifi module 223 to establish a wireless connection with at least one external device, such as external electronic device 102, using the 2.4 GHz/5 GHz frequency band. In one embodiment, the processor 210 can determine whether communication using the 60 GHz band is possible using peer to peer discovery.

In another embodiment, the processor 210 can determine whether it is possible to communicate using the second frequency band using synchronization information. Using the foregoing frequency band, the external electronic device 102 and the device 240 can exchange synchronization information. The synchronization information includes a discovery channel and discovery window for a 60 GHz NAN Cluster. Based on service discovery frames transmitted during the discovery window for the 60 GHz frequency band, the electronic device 101 can determine whether used by the WiGig module. The processor 210 can determine, based on the exchanged synchronization information, whether communication is possible using the WiGig module over the 60 GHz frequency band.

When the processor 210 determines that it is possible to establish a wireless connection with the external electronic device 102 using the 60 GHz band, the WiGig module establishes a wireless communication with the external device 102.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266, and/or a control circuit for controlling the aforementioned devices.

The panel 262 may be implemented to be, for example, flexible, transparent, or wearable. The panel 262 may be embodied as a single module with the touch panel 252. According to one embodiment, the panel 262 may include a pressure sensor (or a force sensor) for measuring an intensity of pressure on a user's touch. The pressure sensor may be integrated into an integral type with the touch panel 252 or may be implemented as one or more sensors separate from the touch panel 252.

The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The audio module 280 may transmit an audio signal received from the processor 210 to an output device (for example, the speaker 282, the receiver 284, or the earphone 286), and may transmit an audio signal like a voice which is received from an input device (for example, the microphone 288) to the processor 210. The audio module 280 may convert voice/audio data into an audible sound and output the audible sound through the output device under the control of the processor 210, and may convert an audio signal like a voice received from the input device into a digital signal and transmit the digital signal to the processor 210.

The speaker 282 or the receiver 284 may output audio data which is received from the communication module 220 or stored in the memory 230. The speaker 282 or the receiver 284 may output an audio signal related to various operations (functions) performed in the electronic device.

The microphone 288 may receive an external audio signal and may process the audio signal into electric voice data. The microphone 288 may implement various noise reduction algorithms for removing a noise occurring in the process of receiving an external audio signal. The microphone 288 may serve to input an audio streaming such as a voice command or the like.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like.

Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
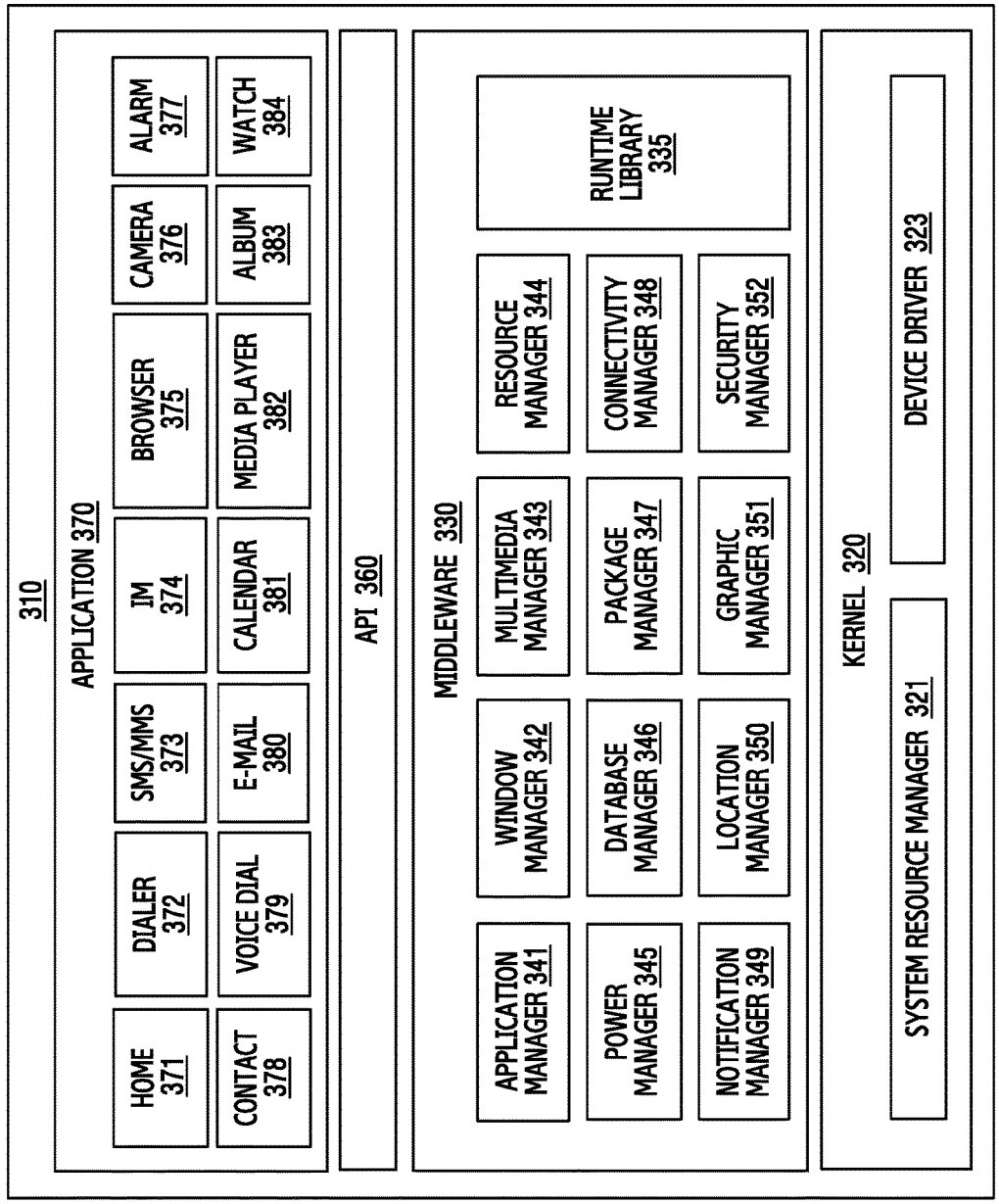
FIG. 3 is a block diagram of a program module according to various exemplary embodiments of the present disclosure.

FIG. 3 is a block diagram of a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

Referring to FIG. 3, the program module 310 may include a kernel 320 (for example, the kernel 141), a middleware 330 (for example, the middleware 143), an API 360 (for example, the API 145), and/or an application 370 (for example, an application program 147). At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, a WiGig driver, an 802.11ah driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may manage a capacity of a battery or power, for example, and may provide power information necessary for the operation of the electronic device. According to one embodiment, the power manager 34 may interwork with a basic input/output system (BIOS).

The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi, WiGig, 802.11 ah, or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like.

According to one embodiment, the middleware 330 may include a telephony manager for managing a voice of the electronic device or a video communication function, or a middleware module for forming a combination of the functions of the aforementioned elements. According to an embodiment of the present disclosure, the middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

For example, the application 370 may include applications such as a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, a watch 384, or the like. According to various exemplary embodiments, the application 370 may include a health care application (for example, for measuring exercise or blood glucose) or an environmental information (for example, atmospheric pressure, humidity, or temperature information) providing application, or the like.

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may transmit notification information generated in another application of the electronic device to an external electronic device, or may receive notification information from an external electronic device and provide the notification information to the user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104).

According to an embodiment of the present disclosure, the applications 370 may include an application received from an external electronic device (e.g., the server 106, or the electronic device 102 or 104).

At least a portion of the program module 310 may be implemented (for example, executed) by software, firmware, hardware (for example, the processor 210), or a combination of two or more thereof, and may include, for example, modules, programs, routines, sets of instructions, or processes, or the like for performing one or more functions.

The term "module" used herein may represent, for example, a unit including hardware, or hardware in combination with software. The term "module" may be interchangeably used with the terms "logic," "logical block," "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include an application-specific IC (ASIC) chip, field-programmable gate arrays (FPGAs), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media (for example, the memory 130) in the form of a programmable module. The instruction, when executed by one or more processors (e.g., the application processor 120), may perform a function corresponding to the instruction.

The computer-readable recording media may include a hard disk, a floppy disk, a magnetic media (e.g., a magnetic tape), an optical recording media (e.g., compact disc read only memory (CD-ROM) and a digital versatile disc (DVD), a magneto-optical media (e.g., a floptical disk), and an internal memory. Also, an instruction may include a code generated by a compiler or a code executable by an interpreter. A module or a program module according to various embodiments of the present disclosure may include at least one of the above elements, or a portion of the above elements may be omitted, or additional other elements may be further included.

According to various exemplary embodiment, the recording medium may include a computer-readable recording medium having a program recorded thereon, for executing various methods described below in the processor 120, 210.

Operations performed by a module, a program module, or other elements according to various embodiments of the present disclosure may be executed sequentially, in parallel, repeatedly, or in a heuristic method, or at least some operations may be executed or a different order or omitted, or other operations may be added.

Various exemplary embodiments of the present disclosure provide a method for communicating with another external device by efficiently utilizing multiple frequency bands in an electronic device, which can support multiple frequency bands in a WiFi-based network, and an apparatus therefor.

According to various exemplary embodiments of the present disclosure, the electronic device may support a first communication (for example, WiFi-based short-range communication) function and a second communication (for example, WiGig-based super-high speed short-range communication) function, and may include all devices which use one or more processors such as an AP, a CP, a GPU, and a CPU. In some embodiments, the electronic device may support a third communication (for example, 802.11 ah) function. For example, the electronic device according to various exemplary embodiments may include all information and communication devices supporting a communication function, multimedia devices, wearable devices, IoT devices, or application devices thereof.

Hereinafter, an operating method and an apparatus according to various exemplary embodiments of the present disclosure will be described with reference to the accompanying drawings. However, since various exemplary embodiments of the present disclosure are not restricted or limited by the following description, it should be noted that the present disclosure can be applied to various exemplary embodiments based on the following embodiments. In various exemplary embodiments described below, a hardware level approach method will be described by way of an example. However, since various exemplary embodiments of the present disclosure include technology which use both hardware and software, various exemplary embodiments of the present disclosure do not exclude an approach method based on software.

According to various exemplary embodiments, the electronic device may be wirelessly connected with an external electronic device using at least one of first wireless communication or second wireless communication. For example, the electronic device may transmit data to another electronic device using the first wireless communication, or transmit data to another electronic device using the second wireless communication, or may transmit data to another electronic device using the first wireless communication and the second wireless communication.

According to various exemplary embodiments, since super-high speed short-range communication (communication based on the 60 GHz band) has a high carrier frequency, its allowable frequency bandwidth reaches several GHz. Therefore, the super-high speed short-range communication may be suitable to super-high speed (for example, a Gbps level) data transmission or multimedia data transmission. The radio wave characteristic of the 60 GHz band is less probability of interference between the same channels due to absorption by oxygen molecules in the atmosphere. Accordingly, since the same frequency is reused, an economical system can be achieved. In another example, since the wavelength of the 60 GHz band, expressed by millimeter, is very small, an antenna and an RF transceiver can be miniaturized and lightened. Accordingly, a high-gain antenna may be used to transmit a transmission signal to a reception antenna. The beam width of electromagnetic waves emitted from an antenna is in inverse proportion to the diameter of the antenna. Therefore, as the wavelength is shorter, the antenna may be made smaller. In still another example, elements having sizes which are in proportion to wavelengths, such as a waveguide, can be miniaturized and thus equipment can be miniaturized. In addition, the signals of the 60 GHz band basically use low power (for example, a unit of tens of mW).

Figure 4:
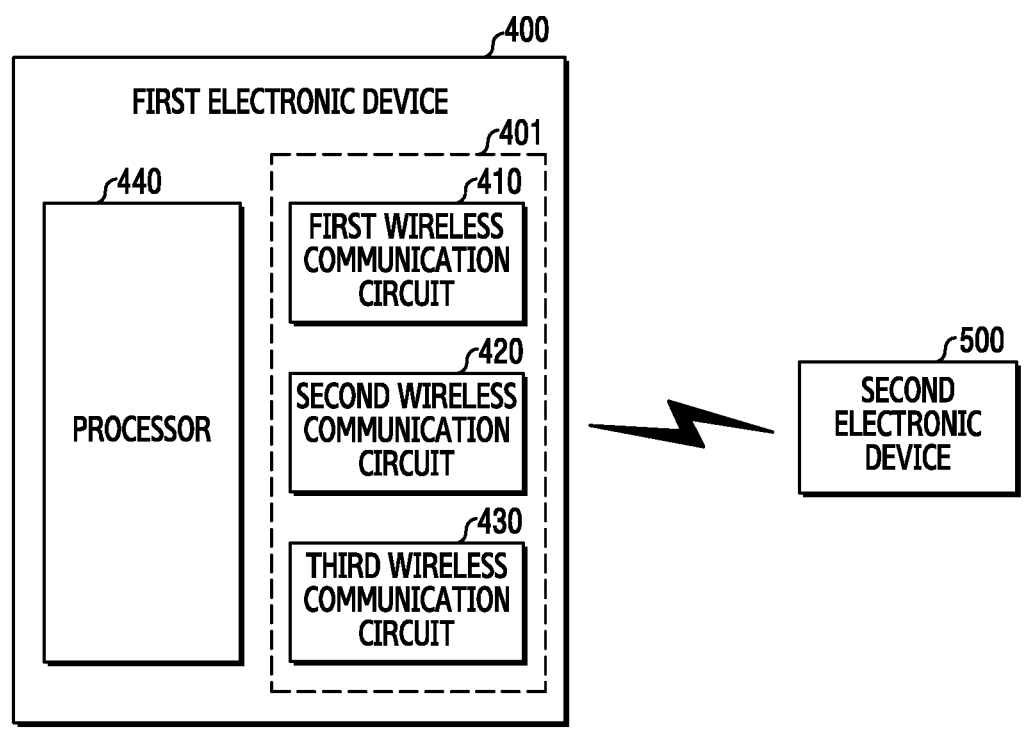
FIG. 4 is a view showing an example of communicating between electronic devices according to various exemplary embodiments of the present disclosure.

FIG. 4 is a view showing an example of communication between electronic devices according to various exemplary embodiments of the present disclosure. For example, a first electronic device 400 or a second electronic device 500 may the electronic device 101 of FIG. 1 or the second electronic device 201 of FIG. 2.

Referring to FIG. 4, a system according to various exemplary embodiments may include the electronic device 400 (hereinafter, referred to as the first electronic device 400) and at least one external electronic device 500 (hereinafter, referred to as the second electronic device 500). For example, FIG. 4 illustrates an example of the first electronic device 400 and the second electronic device 400 being connected with each other. In another example, FIG. 4 illustrates an example of the first electronic device 400 being connected with the second electronic device 500 using a wireless communication circuit 401 and establishing a specific group (for example, a P2P group).

According to various exemplary embodiments, the first electronic device 400 may include, for example, one or more wireless communication circuits 401 and a processor 440. According to various exemplary embodiments, the wireless communication circuit 401 may include an entirety or a part of the communication module 220 shown in FIG. 2. For example, the wireless communication circuit 401 may include a first wireless communication circuit 410, a second wireless communication circuit 420, and a third wireless communication circuit 430. The electronic device 400 may include more elements or fewer elements than the elements shown in FIG. 4. According to one embodiment, the electronic device 400 may have the same or similar configuration as or to that of the electronic device of FIG. 1 or 2. According to one embodiment, the first electronic device 400 may provide the first wireless communication circuit 410 and the second wireless communication circuit 420 in the form of a single chip. According to one embodiment, the electronic device 400 may not include the third wireless communication circuit 430 according to the performance or type of the device.

The first wireless communication circuit 410 may have the same or similar configuration as or to that of the WiFi module 223 of FIG. 2, for example. Alternatively, the first wireless communication module 410 may include another module for performing short-range communication, for example. According to various exemplary embodiments, the short-range communication technology may use, for example, Bluetooth, BLE, RFID, IrDA, UWB, Zigbee, NFC, or the like. For example, the first wireless communication circuit 410 may transmit and receive radio signals between the first electronic device 400 and the second electronic device 500 based on first wireless communication. According to various exemplary embodiments, the first wireless communication may include short-range communication such as WiFi (for example, an effective coverage of 100 m-250 m) or the above-described other short-range communication. The first wireless communication circuit 410 may transmit and receive radio signals to and from the second electronic device 500. For example, the radio signal may include at least a part of a voice signal, a data signal, or various control signals. For example, the first wireless communication circuit 410 may transmit various data necessary for the operation of the first electronic device 400 to the second electronic device 500 or receive data from the second electronic device 500 in response to a user request.

According to various exemplary embodiments, the first wireless communication circuit 410 may indicate a block which supports various other communication methods supported in the first electronic device 400 separately from second wireless communication (for example, super-high speed short-range communication). According to various exemplary embodiments, the first electronic device 400 and the second electronic device 500 may expand usability by further including and connecting additional communication in a state in which the first electronic device 400 and the second electronic device 500 are connected with each other through the first wireless communication by default. For example, the first electronic device 400 may establish a first group (for example, a P2P group of a first frequency band) by discovering the second electronic device 500 first through the first wireless communication by the first wireless communication circuit 410, and may determine, in the first group, whether the second electronic device 500 is able to perform the second wireless communication. According to various exemplary embodiments, when the first electronic device 400 is able to be connected with the second electronic device 500 through the second wireless communication circuit 420, the first electronic device 400 may disconnect the connection of the first wireless communication by the first wireless communication circuit 410 (or wait), may establish a second group (for example, a P2P group of a second frequency band) between the first electronic device 400 and the second electronic device 500 by using the second wireless communication using the second wireless communication circuit 420. Further, the first electronic device 400 may select at least one group of the first group or the second group in consideration of a data transmission state (for example, a transmission speed, a transmission capacity) and cause the selected group to perform data communication.

For example, when the amount of data to be transmitted is high, such as transferring of high definition video content, and the first communication group is a WiFi P2P group, and the second communication group is a WiGig P2P group, the first electronic device may select the second communication group, because WiGig supports higher data rates. In certain embodiments, the first electronic device 400 can be a tablet or smartphone using a video streaming application, while the second electronic device 500 can be a smart TV. Where the user desires to pair video to the smart TV, depending on the resolution of the video (such as HDTV or UHDTV) the device can select the WiFi P2P or WiGig P2P. According to various exemplary embodiments, the second wireless communication circuit 420 may include a module for enabling the second wireless communication between the first electronic device 400 and the second electronic device 500. According to various exemplary embodiments, the second wireless communication may include super-high speed short-range communication such as WiGig. WiGig may indicate wireless communication technology of a multi-giga bit speed which operates in a 60 GHz or higher frequency band.

For example, the second wireless communication circuit 420 may wirelessly transmit a data rate of USB 3.0 (for example, 3 Gbps) using four channels of the 60 GHz band which is an industrial scientific medical (ISM) band, and may have an effective coverage of 10 m-30 m and may be configured to approach or be close to the second electronic device 500 and promptly recognize and drive the second electronic device 500. For example, the second wireless communication circuit 420 may wirelessly exchange radio signals with the second electronic device 500. The radio signal may include a voice signal, a data signal, or various control signals. The second wireless communication circuit 420 may transmit or receive various data necessary for the operation of the first electronic device 400 to or from the second electronic device 500 in response to a user request. The second wireless communication circuit 420 is advantageous from the aspect of power consumption and may provide the second wireless communication when the first electronic device 400 and the second electronic device 500 is brought into contact with each other within the effective coverage.

The third wireless communication circuit 430 may include a module for enabling third wireless communication between the first electronic device 400 and the second electronic device 500. According to various exemplary embodiments, the third wireless communication may indicate wireless communication technology of a giga bit speed which operates in the sub 1 GHz (for example, 802.11ah) frequency band. According to various exemplary embodiments, the third wireless communication may accept a wider coverage than that of the first wireless communication (for example, the 2.4 GHz/5 GHz frequency band) in view of the frequency characteristic of the sub 1 GHz band. For example, the third wireless communication may have a coverage of about 1 km in comparison to the first wireless communication which covers 100 m-250 m. In another example, the third wireless communication may down clock an existing clock by $1/10$ or reduce a bandwidth and a data rate by at most $1/10$, and thus may operate with low power without reducing a transmission speed. According to various exemplary embodiments, the third wireless communication like sub 1 GHz is based on the standard of 802.11ah and may support a wider coverage, low power, and a low transmission speed.

The processor 440 may control the overall operation of the first electronic device 400. According to various exemplary embodiments, the processor 440 may have the same or similar configuration as or to that of the processor 210 of FIG. 2. According to various exemplary embodiments, the processor 440 may process operations related to discovering between the first electronic device 400 and the second electronic device 500, generating a group, and communicating data. According to various exemplary embodiments, the processor 440 may discover a counterpart electronic device in the first frequency band and may be connected with the discovered counterpart electronic device using the first frequency band. The processor 440 may generate (establish) a first group based on the first frequency band with the connected counterpart electronic device.

The electronic device 400 can determine whether it is possible to perform communications using the second frequency band by either engaging in the discovery process of the second frequency band, or exchanging synchronization information of the second frequency band while in the first group and discovering the second frequency band using low power.

Turning first to determining whether it is possible to perform communications using the second frequency band by engaging in the discovery process, after generating the first group, the processor 440 may discover the second frequency band for the counterpart electronic device of the first group, and may determine whether a peer device is discovered in the second frequency band. For example, the processor 440 may determine whether there exists a counterpart electronic device that is able to perform communication by the second frequency band in the first P2P group of the first frequency band, through by discovering the second frequency band.

When a peer device is not discovered in the second frequency band, the processor 440 may process data communication by the first wireless communication (for example, WiFi communication) based on the first wireless communication circuit 410. When a peer device is discovered in the second frequency band, the processor 440 may generate (establish) a second group based on the second frequency band, and may process data communication by the second wireless communication (for example, super-high speed short-range communication (or WiGig communication of 60 GHz) based on the second wireless communication circuit 420.

A controlling operation of the processor 440 according to various exemplary embodiments will be described in detail with reference to the accompanying drawings. According to various exemplary embodiments of the present disclosure, the processor 440 may be implemented by using one or more processors for controlling the operation of the first electronic device 400 according to various exemplary embodiments of the present disclosure by executing one or more programs stored in a memory (for example, the memory 130 of FIG. 1 or the memory 230 of FIG. 2).

According to various exemplary embodiments, the second electronic device 500 may have a similar configuration corresponding to the first electronic device 400, for example. According to one embodiment, the second electronic device 500 may include at least one wireless communication circuit corresponding to the first wireless communication circuit 410, the second wireless communication circuit 420, or the third wireless communication circuit 430 of the first electronic device 400 according to the performance or type of the second electronic device 500, and may include a processor corresponding to the processor 440 of the first electronic device 400.

According to various exemplary embodiments, the first electronic device 400 and the second electronic device 500 may be connected with each other based on wireless communication (for example, the first wireless communication, the second wireless communication, or the third wireless communication) technology of various frequency bands (for example, the first frequency band, the second frequency band, or the third frequency band). According to one embodiment, the first wireless communication (for example, short-range communication, WiFi) of the first frequency band (for example, the 2.4 GHz/5 GHz band) may be performed within a coverage of about 100 m-250 m. According to one embodiment, the second wireless communication (for example, super-high speed short-range communication, WiGig) of the second frequency band (for example, the 60 GHz band) may be performed within a coverage of about 10 m-30 m. According to one embodiment, the third wireless communication (for example, long-range communication, sub 1 GHz) of the third frequency band (for example, the 1 GHz band) may be performed within a coverage of about 1 Km.

According to various exemplary embodiments, the first electronic device 400 and the second electronic device 500 may establish a P2P group through P2P connection by the first wireless communication as shown in FIG. 4. For example, the P2P group may include a group which is established by connecting WiFi electronic devices with each other by using WiFi P2P technology.

According to one embodiment, when it is assumed that electronic devices are connected with each other one on one (1:1), one electronic device may operate as a group owner (GO) and the other electronic device (for example, a peer device) may operate as a group client (GC). For example, the group owner electronic device (hereinafter, a group owner) may perform a function like an access point (AP) of a WLAN network, and the group client electronic device (hereinafter, a group client) may perform a function like a station of the WLAN network. The roles of the P2P electronic devices described above may be determined through a protocol used only by P2P technology, which is known as "group owner negotiation" in a WiFi P2P connecting process. According to various exemplary embodiments, the P2P group may be generated using WiFi P2P technology not only in a 1:1 connection as in the example of FIG. 4, but also in a 1:N connection, and the number of acceptable group clients may be determined according to the capability of the group owner.

The IEEE 802.11ad WiGig may represent standard technology which has been developed to guarantee a wider bandwidth in a new unlicensed band, for example, in the 60 GHz band, to overcome a narrow bandwidth limit of the 2.4 GHz/5 GHz band used by existing WiFi, and to show a multi-Gbps level wireless transmission speed.

Following table 1 indicates an example of comparing 802.11ac WiFi and 802.11ad WiGig:

TABLE 1

|  | 802.11ac WiFi | 802.11ad WiGig |
| --- | --- | --- |
| Frequency Band | 2.4 GHz/5 GHz | 60 GHz |
| PHY Rate (on a terminal basis) | Up to 433 Mbps (150 Mbps @2.4 GHz) | Up to 4.6 Gbps |
| Coverage | 100 m to 250 m, transmissible through a wall | 10 m to 30 m, not transmissible through a wall |
| Interference | Serious | Rarely (Avoided due to a short distance/directivity) |
| Power Consumption | About peak 0.5 W | About peak 0.7 W |
| Energy Efficiency | 891 Mbit/J | 2300 Mbit/J |

As shown in table 1, the main characteristic of WiGig is that a physical rate is 10 times higher than that of WiFi and there is rarely interference between devices, and thus there is an advantage that stable high-speed communication is possible. However, WiGig has the demerits of a short coverage and high peak power consumption in comparison to WiFi. Herein, in the case of power consumption, an average amount of power required to transmit data is more important. Since the energy efficiency of WiGig is high, substantial power consumption of WiGig may be low according to an operation of a sleep mode of an electronic device.

In another example, a normal radio wave characteristic is that a signal greatly decreases and transmissivity is reduced as a frequency increases and thus the radio wave has a disadvantage in wireless transmission. Accordingly, the 802.11ad standard technology utilizes an unlicensed band ranging from 57 GHz to 66 GHz as multi-Gbps transmission technology by using array beamforming technology to overcome the disadvantage of the radio wave characteristic of the 60 GHz band.

The 802.11ad technology using the 60 GHz band may be advantageous to direct communication between electronic devices requiring a high transfer rate at a short distance. When the 802.11 ad technology of the 60 GHz band is applied to electronic devices, the electronic devices should be designed in consideration of compatibility with the P2P technology of the 2.4 GHz/5 GHz band. That is, the 802.11ad technology should be efficiently used without breaking the compatibility with electronic devices supporting the 2.4 GHz/5 GHz band. In particular, a seamless service should be provided by using different coverages between the two bands. At present time, a practical P2P connection method considering the above-described situation is not explicitly defined.

Accordingly, in various exemplary embodiments of the present disclosure, short range and long range scenarios can be efficiently managed and a data transmission efficiency can be enhanced by using different frequency bands, simultaneously, as described above.

According to various exemplary embodiments, an electronic device may include: a first wireless communication circuit configured to perform wireless communication with at least one external electronic device by using a first frequency band; a second wireless communication circuit configured to perform wireless communication with the at least one external electronic device by using a second frequency band; and a processor functionally connected with the first wireless communication circuit and the second wireless communication circuit. The processor may be configured: establish a connection with the at least one external electronic device based on the first frequency band by using the first wireless communication circuit; determine whether it is possible to establish a connection with the at least one external electronic device based on the second frequency band by using the second wireless communication circuit; when it is not possible to establish a connection with the at least one external electronic device based on the second frequency band according to the determining, perform data communication with the at least one external electronic device based on the first frequency band; and when it is possible to establish a connection with the at least one external electronic device based on the second frequency band, perform data communication with the at least one external electronic device based on the second frequency band.

Turning now to determining whether it is possible to perform communications using the second frequency band by exchanging synchronization information of the second frequency band while in the first group and discovering the second frequency band using low power, the processor may be configured to exchange synchronization information of the second frequency band while in the first P2P group with the at least one external electronic device. The electronic device determines whether it is possible to establish a connection based on the second frequency band based on at least a part of the synchronization information.

According to various exemplary embodiments, the synchronization information may include an identification of a discovery channel and a discovery window for discovering.

The discovery channel and discovery window can be used to establish a cluster for the second frequency. Using the discovery channel during the discover window, the electronic device 400 and electronic device 500 can exchange service discovery frames. According to various exemplary embodiments, the processor may be configured to perform a low-power discovery based on the second frequency band through a low-power discovery window shared with the at least one external electronic device.

According to various exemplary embodiments, when it is not possible to establish a connection with the at least one external electronic device based on the second frequency band, the processor may be configured to process data communication based on the first frequency band, and perform a low-power discovery for discovering the at least one external electronic device based on the second frequency band according to a predetermined period.

According to various exemplary embodiments, when a connection with the at least one external electronic device is established based on the second frequency band, the processor may be configured to select at least one connection for data communication from among a connection based on the first frequency band and a connection based on the second frequency band in consideration of a data transmission state.

According to various exemplary embodiments, when a connection based on the second frequency band is established, the processor may be configured to disconnect a connection based on the first frequency band or maintain the connection based on the first frequency band in a power save state.

According to various exemplary embodiments, the first frequency band may have a coverage larger than that of the second frequency band.

According to various exemplary embodiments, the first frequency band may include a 2.4 GHz/5 GHz band, and the second frequency band may include a 60 GHz band.

According to various exemplary embodiments, the electronic device may further include a third wireless communication circuit configured to perform wireless communication with the at least one external electronic device based on a third frequency band, and the processor may be configured to control a conversion among the second frequency band, the first frequency band, and the third frequency band.

According to various exemplary embodiments, the first frequency band may have a coverage larger than that of the second frequency band, and the third frequency band may have a coverage larger than that of the first frequency band.

According to various exemplary embodiments, the third frequency band may include a sub 1 GHz band.

According to various exemplary embodiments, when at least one connection is established from among a connection based on the first frequency band or a connection based on the second frequency band, the processor may be configured to determine whether it is possible to establish a connection with a new external electronic device based on the first frequency band or the second frequency band, and to establish a connection with the new external electronic device based on the first frequency band or the second frequency band according to the determining.

Figure 5:
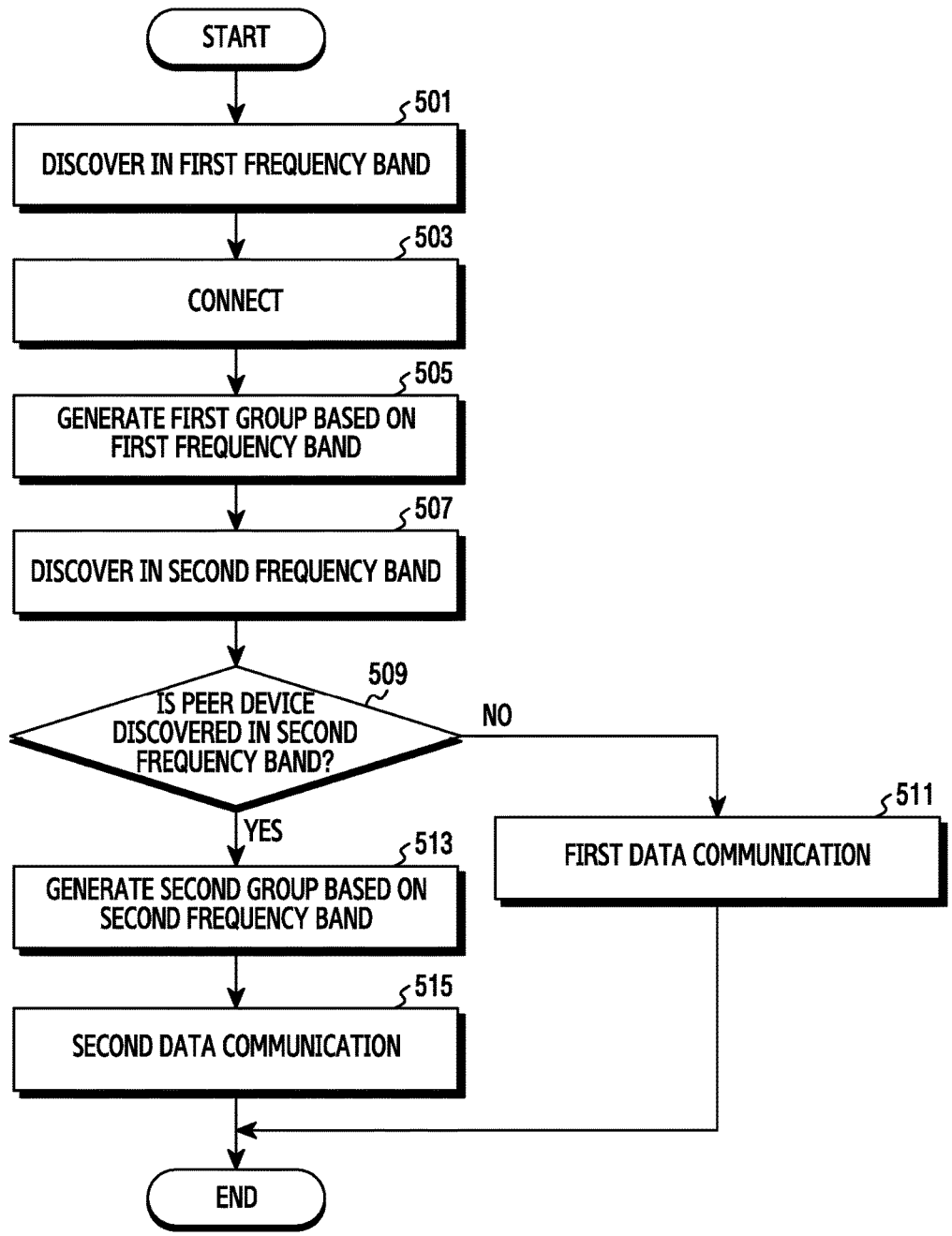
FIG. 5 is a flowchart showing a method for communicating by using multiple frequency bands in an electronic device according to various exemplary embodiments of the present disclosure.

FIG. 5 is a flowchart showing a method for communicating by using multiple frequency bands in an electronic device according to various exemplary embodiments of the present disclosure. In FIG. 5, the electronic device 400 determines whether the communication using the second frequency band is possible by engaging in the discovery process.

Referring to FIG. 5, in operation 501, the electronic device (for example, the electronic device 400 of FIG. 4) may discover at least one external electronic device based on a first frequency band. For example, the processor of the electronic device (for example, the processor 440 of FIG. 4) may discover a counterpart electronic device based on the first frequency band.

In operation 503, the processor 440 may control to wirelessly connect with the at least one external electronic device discovered in operation 501. For example, when a WiFi direct connection is initiated, the processor 440 may perform a P2P discovery using the 2.4 GHz/5 GHz band through the first wireless communication circuit 410. When a counterpart electronic device is selected after the P2P discovery process, the processor 440 may be connected with the selected counterpart electronic device.

In operation 505, the processor 440 may generate (establish) a first group based on the first frequency band with the counterpart electronic device. For example, when the counterpart electronic device is selected, the processor 440 may establish a first P2P group with the counterpart electronic device (for example, at least one external electronic device) as an operation channel of the 2.4 GHz or 5 GHz band.

In operation 507, the processor 440 may discover at least one peer device based on a second frequency band.

In operation 509, the processor 440 may determine whether a peer device is discovered in the second frequency band based on the result of discovering in operation 507. For example, the processor 440 may determine whether there exists at least one external electronic device that can communicate by using the second frequency band in the first P2P group of the first frequency band.

When the peer device is not discovered in the second frequency band in operation 509 (No in operation 509), the processor 440 may process an operation related to first data communication in operation 511. For example, the processor 440 may perform data communication with the counterpart electronic device using the first frequency band. According to one embodiment, the processor 440 may process data communication by the first wireless communication (for example, WiFi communication) based on the first wireless communication circuit 410.

When the peer device is discovered in the second frequency band in operation 509 (Yes in operation 509), the processor 440 may generate (establish) a second group based on the second frequency band in operation 513. For example, when the peer device that can communicate by using the second frequency band is discovered in the first P2P group of the first frequency band, the processor 440 may establish a second P2P group as an operation channel of the 60 GHz band.

In operation 515, the processor 440 may process an operation related to second data communication. For example, the processor 440 may perform data communication with the peer device (counterpart electronic device) using the second frequency band. According to one embodiment, the processor 440 may process data communication by the second wireless communication (for example, super-high speed short-range communication (or WiGig communication of the 60 GHz) based on the second wireless communication circuit 420.

According to various exemplary embodiments, the 802.11ad technology may be applied while maintaining compatibility with WiFi direct technology utilizing the 2.4 GHz/5 GHz band. Hereinafter, a WiFi direct connection method and a communication channel selection method suggested in various exemplary embodiments, for example, a detailed method for utilizing multiple P2P groups of multiple frequency bands, will be described.

Figure 6:
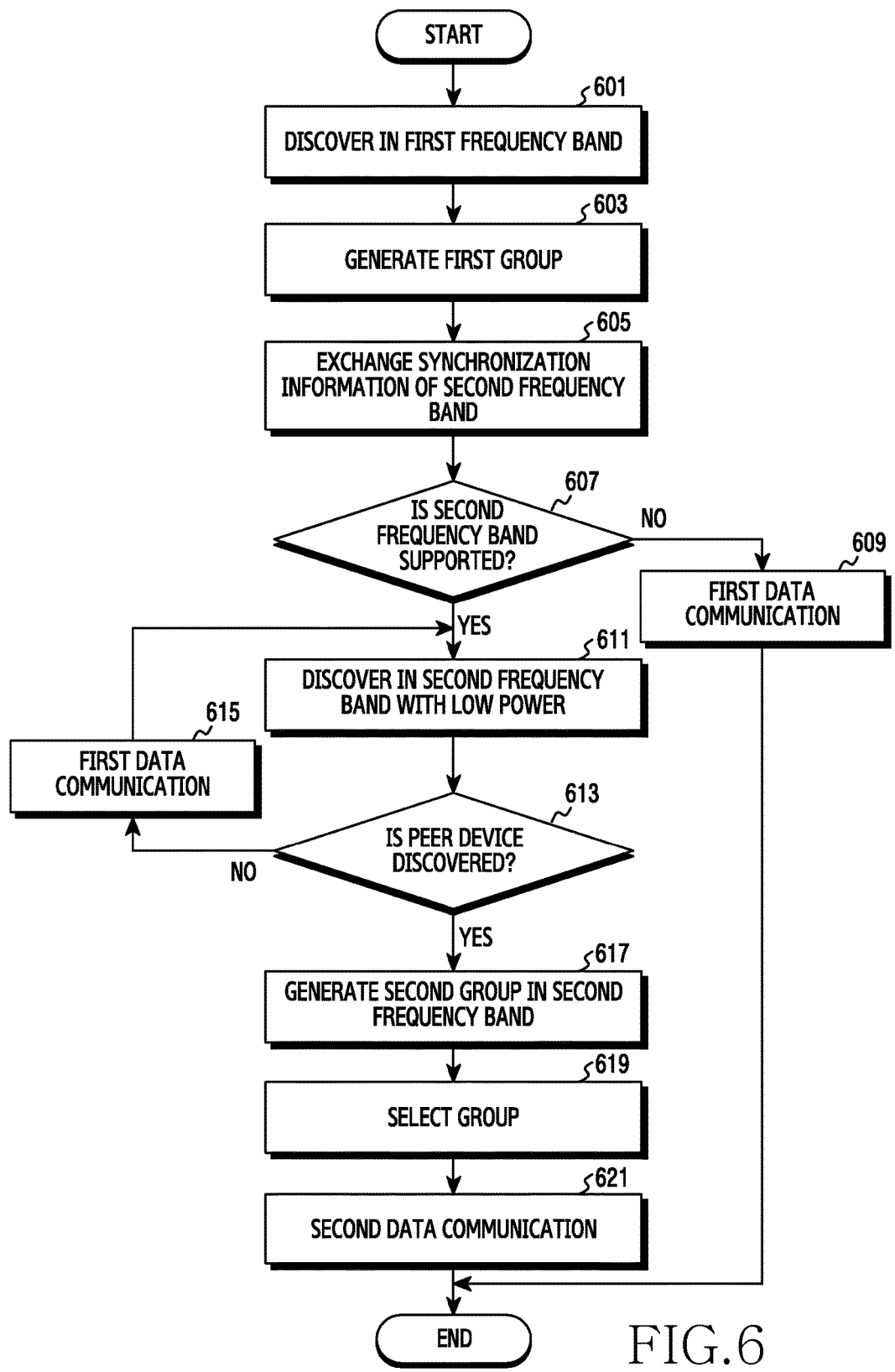
FIG. 6 is a flowchart showing a method for communicating by using multiple frequency bands in an electronic device according to various exemplary embodiments of the present disclosure.

FIG. 6 is a flowchart showing a method for communicating by using multiple frequency bands in an electronic device according to various exemplary embodiments of the present disclosure. In FIG. 6, the electronic device 400 determines whether the communication using the second frequency band is possible by exchanging synchronization information and using a low power discovery process.

Referring to FIG. 6, in operation 601, the processor 440 of the electronic device 400 may discover at least one external electronic device based on a first frequency band. For example, the processor 440 may discover a counterpart electronic device based on the first frequency band.

In operation 603, the processor 440 may generate (establish) a first group with the at least one external electronic device discovered in operation 601. For example, when a WiFi direct connection is initiated, the processor 440 may perform a P2P discovery process utilizing the 2.4 GHz/5 GHz band. When a counterpart electronic device (for example, at least one external electronic device) is selected after the P2P discovery process, the processor 440 may establish a first P2P group with the selected counterpart electronic device as an operation channel of the 2.4 GHz or 5 GHz band.

According to various exemplary embodiments, the electronic device 400 may initiate inter-device communication through a device discovery process and a connection process. The device discovery process is a process of devices existing in different channels discovering each other to connect with each other, and for example, may be performed in three phases, that is, scan, listen, and search phases. According to one embodiment, in the scan phase, the processor 440 discovers devices in all channels, and, after the scan phase, the processor 440 alternately performs the listen phase and the search phases to discover a device. According to one embodiment, in the listen phase, the processor 440 may select a random time in one of specific channels (for example, social channel numbers 1, 6, and 11), and may wait for a probe request message to be transmitted from another electronic device. When the listen phase ends, the electronic device 400 may enter the search phase to transmit the probe request message while traveling through the social channels and wait for a probe response message. According to one embodiment, after searching all of the specific channels (channel numbers 1, 6, and 11) in the search phase, the electronic device 400 may repeat the listen phase again. When the probe-related messages are exchanged during the device discovery process as described above, the electronic device 400 and the counterpart electronic device may recognize (discover) each other, may try to connect each other when the user selects a connection, and may select a group owner (GO). For example, the group owner may perform an operation like a virtual AP and only one device may be selected as the group owner in the corresponding group.

In operation 605, the processor 440 may exchange synchronization information of a second frequency band. For example, the two electronic devices (for example, the electronic device 400 and the counterpart electronic device) may determine whether the two electronic devices support 60 GHz channels through the first P2P group, and for example, may share information regarding a discovery channel (DC) and a discovery window (DW) for discovering with each other.

According to one embodiment, the discovery window may prescribe that a common channel should be used, and for example, may basically prescribe that channel number 6 of 2.4 GHz is used as a common channel and a channel of 5 GHz (for example, channel number 149) is used as an option. According to one embodiment, the channel of the 5 GHz band may not be used since allowed channels differ from country to country. According to various exemplary embodiments, the electronic device (for example, the processor 440 of the electronic device 400) selected as the group owner (GO) of the first P2P group may transmit synchronization information to the counterpart electronic device or may operate in reverse. For example, when the first P2P group is established and the two electronic devices are woken up at a scheduled time, the two electronic devices may determine whether they exist in the coverage of the 60 GHz band by exchanging a discovery packet with each other in a corresponding discovery window or in a listen time.

According to various exemplary embodiments, the synchronization information can be used to establish a discovery window and channel in a Wi-Fi neighbor awareness networking (NAN) cluster, utilizing NAN technology. According to one embodiment, the electronic device selected as the group owner of the first P2P group may establish an NAN cluster of the 60 GHz band to determine the 60 GHz capabilities and may transmit relevant information to the counterpart electronic device or vice versa. According to various exemplary embodiments, the two electronic devices may share the listen time for periodically exchanging the discovery packet with each other without NAN. These examples will be described below with reference to the drawings.

In operation 607, the processor 440 may determine whether the counterpart electronic device supports a second frequency band based on the synchronization information. In certain embodiments, the GO of a Wi-Fi P2P can use the synchronization information to establish a NAN cluster and Discovery Window to determine whether the communication is possible using Wi-Gig P2P.

When it is determined that the counterpart electronic device does not support the second frequency band in operation 607 (No in operation 607), the processor 440 may perform first data communication based on the first group of the first frequency band. For example, the processor 440 may transmit data to the counterpart electronic device based on the first wireless communication according to the first frequency band after the device discovery process and the connection process end.

When it is determined that the counterpart electronic device supports the second frequency band in operation 607 (Yes in operation 607), the processor 440 may perform a low-power discovery based on the second frequency band in operation 611.

In operation 613, the processor 440 may determine whether a peer device (for example, a counterpart electronic device using an operation channel of the second frequency band) is discovered or not based on the result of the discovering in operation 611. According to one embodiment, the processor 440 may perform the discovery process of the second frequency band (for example, the 60 GHz band) of the electronic device 400 and the counterpart electronic device through a low-power discovery window (DW) shared with the counterpart electronic device. This will be described with reference to the drawings.

When the peer device is not discovered in operation 613 (No in operation 613), the processor 440 may process an operation related to first data communication in operation 615 and return to operation 611 to perform operations after operation 611. For example, when the peer device based on the second frequency band is not discovered, the processor 440 may perform the low-power discovery to discover the peer device in the second frequency band according to a predetermined period, while processing the first data communication based on the first wireless communication of the first frequency band.

When the peer device is discovered in operation 613 (Yes in operation 613), the processor 440 may generate (establish) a second group with the peer device in the second frequency band in operation 617. For example, when the first P2P group is established and it is determined that the two electronic devices (for example, the electronic device 400 and the counterpart electronic device) exist in a coverage corresponding to the second frequency band (for example, the 60 GHz band), the processor 440 may additionally establish a second P2P group. According to one embodiment, when the peer device is discovered, the processor 440 may establish the second P2P group as an operation channel of the 60 GHz band. According to various exemplary embodiments, when at least one of the two electronic devices does not support the second frequency band (for example, the 60 GHz band) after the first P2P group is connected, the processor 440 may not perform the discovery process to establish the second P2P group.

In operation 619, the processor 440 may select at least one group of the first group and the second group for data communication. For example, when multiple P2P groups including the first P2P group and the second P2P group are established as described above, the processor 440 may select, as an operation channel, the second P2P group of the second frequency band (for example, the 60 GHz band) that has a high speed from among the multiple P2P groups, and may disconnect the first P2P group, or may utilize all of the multiple P2P groups to increase a transfer rate and may aggregate data. For example, the processor 440 may increase a data transmission speed by utilizing the first frequency band of the first P2P group and the second frequency band of the second P2P group as a single frequency band by binding the first frequency band and the second frequency band. In this case, the processor 440 may manage the multiple P2P groups simultaneously. According to various exemplary embodiments, when the second P2P group is selected as a communication channel, the processor 440 may not disconnect the first P2P group and may wait in a power save state while maintaining the first P2P group. In this case, the processor 440 may save a minimum time for transmitting beacons by utilizing various power management techniques (for example, an opportunistic technique defined in the P2P standard or a notice of absence (NoA) technique), and may maintain the sleep state. According to one embodiment, the opportunistic technique is a technique of determining a sleep state of a group owner according to whether data is transmitted to a group client, and may indicate a method which places a client traffic window (CTWindow) of a predetermined period in a beacon period and waits until data is transmitted during this period. According to one embodiment, compared to the opportunistic technique, the NoA technique may indicate a method for determining a time for a group client to transmit data according to a sleep state of a group owner.

In operation 621, the processor 440 may process an operation related to second data communication based on the selected at least one group.

Figure 7:
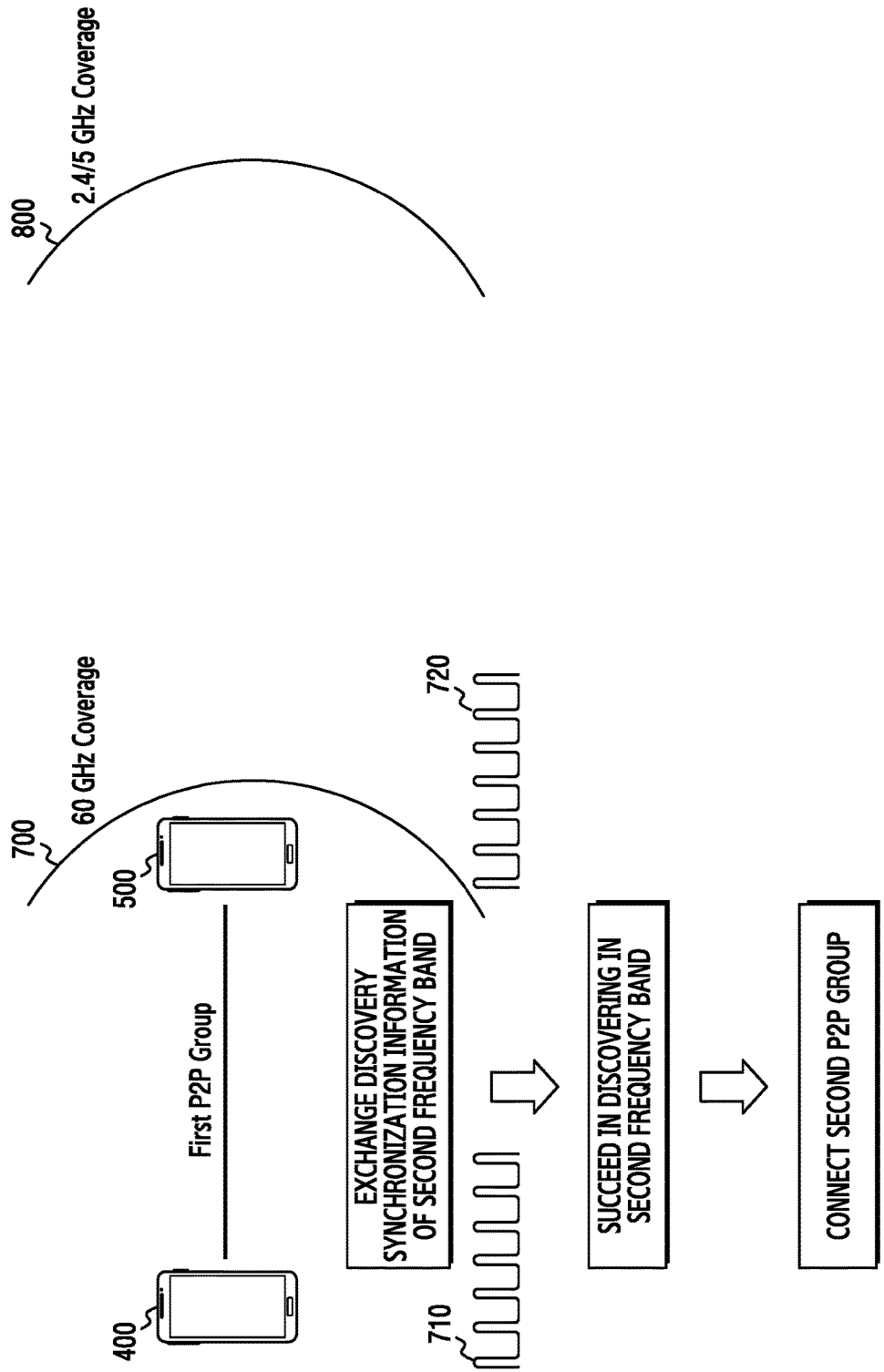
FIG. 7 and FIG. 8 are views showing an example of connecting multiple frequency bands in an electronic device according to various exemplary embodiments of the present disclosure.
Figure 8:
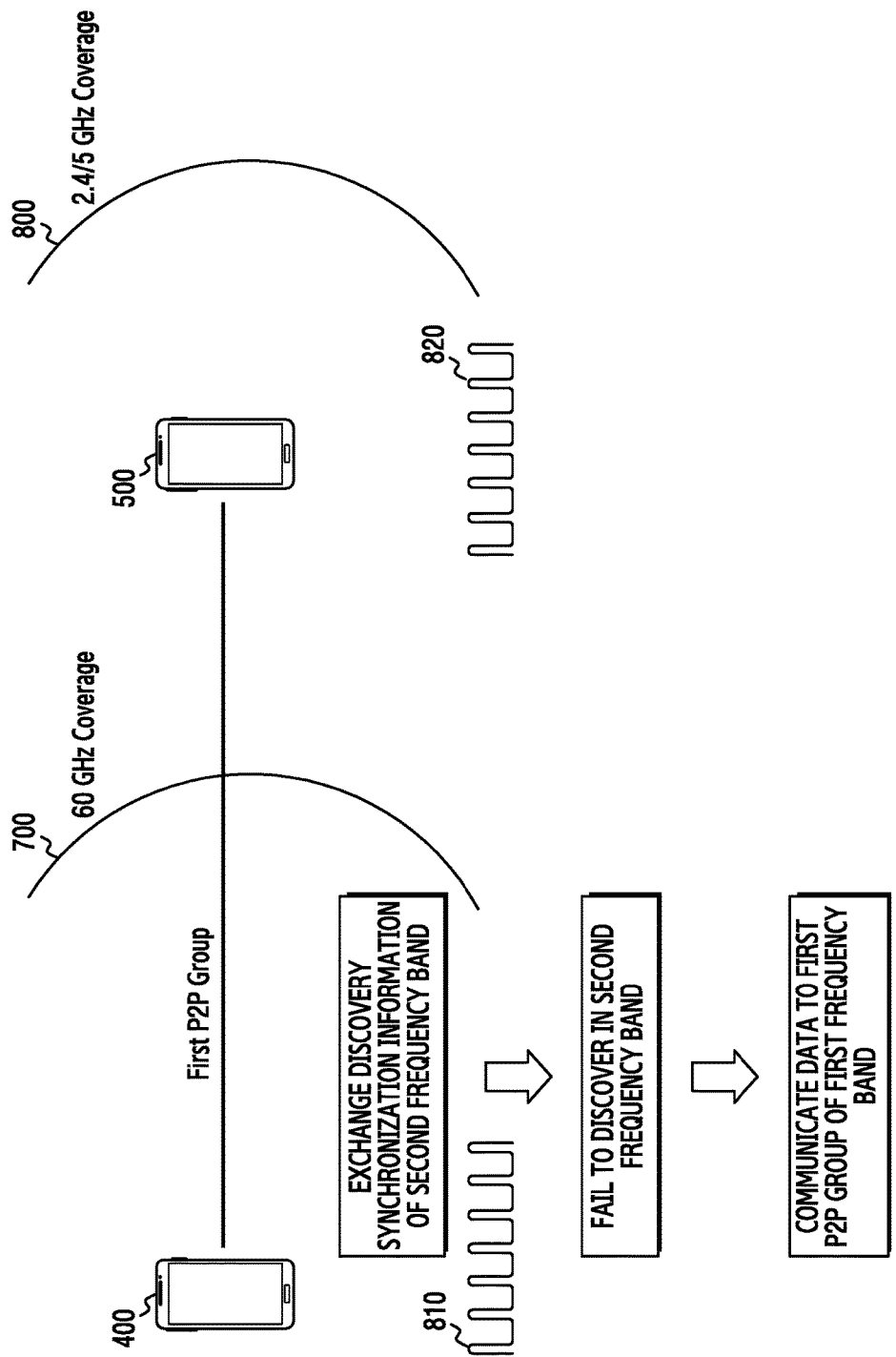

FIGS. 7 and 8 are views showing an example of connecting multiple frequency bands in an electronic device according to various exemplary embodiments of the present disclosure.

According to various exemplary embodiments, FIGS. 7 and 8 illustrate an example of establishing multiple P2P groups by connecting multiple frequency bands based on WiFi Direct, and processing data communication based on the multiple P2P groups.

FIG. 7 describes FIG. 6, operation 613, YES. The electronic device (for example, the first electronic device 400) and at least one external electronic device (for example, the second electronic device 500) may be connected with each other based on a first frequency band or a second frequency band. For example, in FIG. 7, after the electronic device and the external electronic device are connected with each other based on the first frequency band, the electronic device may establish a second P2P group by connecting based on the second frequency band. Hereinafter, the first electronic device 400 and the second electronic device 500 will be described as the electronic device and the at least one external electronic device for convenience of explanation, and the first electronic device 400 or the second electronic device 500 may be the electronic device 101 of FIG. 1 or the electronic device 201 of FIG. 2.

For example, the first electronic device 400 and the second electronic device 500 may exist within a coverage 800 of the first frequency band (for example, the 2.4 GHz/5 GHz band), and may initially connect a first P2P group based on the first frequency band (for example, the 2.4 GHz/5 GHz band). Note that the coverage area for the first P2P group 700 is considerably larger than the coverage area for the second frequency band 800. Thereafter, the first electronic device 400 and the second electronic device 500 may perform a discovery process of the second frequency band (for example, the 60 GHz band) of the first electronic device 400 and the second electronic device 500 through a shared low-power discovery windows (DWs) 710, 720. For example, when the first electronic device 400 and the second electronic device 500 exist in a coverage 700 of the second frequency band (for example, the 60 GHz band), the first electronic device 400 and the second electronic device 500 may discover each other through the discovery process of the second frequency band. In another example, the first electronic device 400 may discover the existence of the second electronic device 500 entering the coverage 700 of the second frequency band through the discovery process of the second frequency band. In still another example, when the second electronic device 500 enters the coverage 700 of the second frequency band, the second electronic device 500 may discover the first electronic device 400 within the coverage 700 of the second frequency band through the discovery process of the second frequency band. When the first electronic device 400 and the second electronic device 500 discover each other by using the second frequency band (for example, succeed in discovering the second frequency band), the first electronic device 400 and the second electronic device 500 may connect the second P2P group in the second frequency band.

According to various exemplary embodiments, when the second P2P group is connected, the first electronic device 400 and the second electronic device 500 may process data communication using the second P2P group of the second frequency band. According to various exemplary embodiments, when the second P2P group is connected, the first electronic device 400 and the second electronic device 500 may process data communication using the first P2P group of the first frequency band, in addition to or in replacement of the second P2P group of the second frequency band. According to various exemplary embodiments, the first electronic device 400 and the second electronic device 500 may maintain the periodic low-power discovery window 710, 720 of the second frequency band even when the second P2P groups is connected.

FIG. 8 describes FIG. 6 operation 613, No. The electronic device (for example, the first electronic device 400) and at least one external electronic device (for example, the second electronic device 500) may be connected with each other based on a first frequency band or a second frequency band. For example, FIG. 8 shows an example to explain an operation of discovering the second frequency band after the electronic device and the external electronic device are initially connected with each other based on the first frequency band.

For example, the first electronic device 400 and the second electronic device 500 may exist within the coverage 800 of the first frequency band (for example, the 2.4 GHz/5 GHz band), and may initially connect the first P2P group based on the first frequency band (for example, the 2.4 GHz/5 GHz band). Thereafter, the first electronic device 400 and the second electronic device 500 may perform a discovery process of the second frequency band (for example, the 60 GHz band) of the first electronic device 400 and the second electronic device 500 through a shared low-power discovery windows (DWs) 810, 820. When the first electronic device 400 and the second electronic device 500 do not exist in the coverage 700 of the second frequency band (for example, the 60 GHz band), for example, when the second electronic device 500 belongs to the coverage 800 of the first frequency band, but is located out of the coverage 700 of the second frequency band, the first electronic device 400 may process data communication through the first P2P group of the first frequency band, while maintaining the periodic low-power discovery windows 810 and 820 of the second frequency band.

Figure 9:
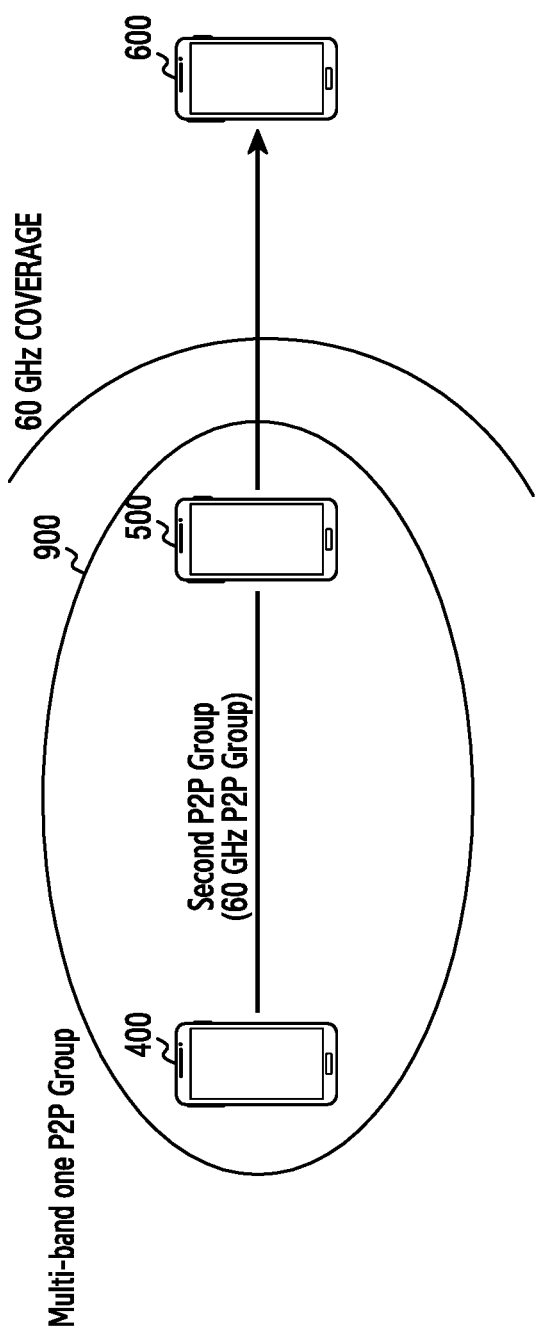
FIG. 9 and FIG. 10 are views showing another example of connecting multiple frequency bands in an electronic device according to various exemplary embodiments of the present disclosure.
Figure 10:
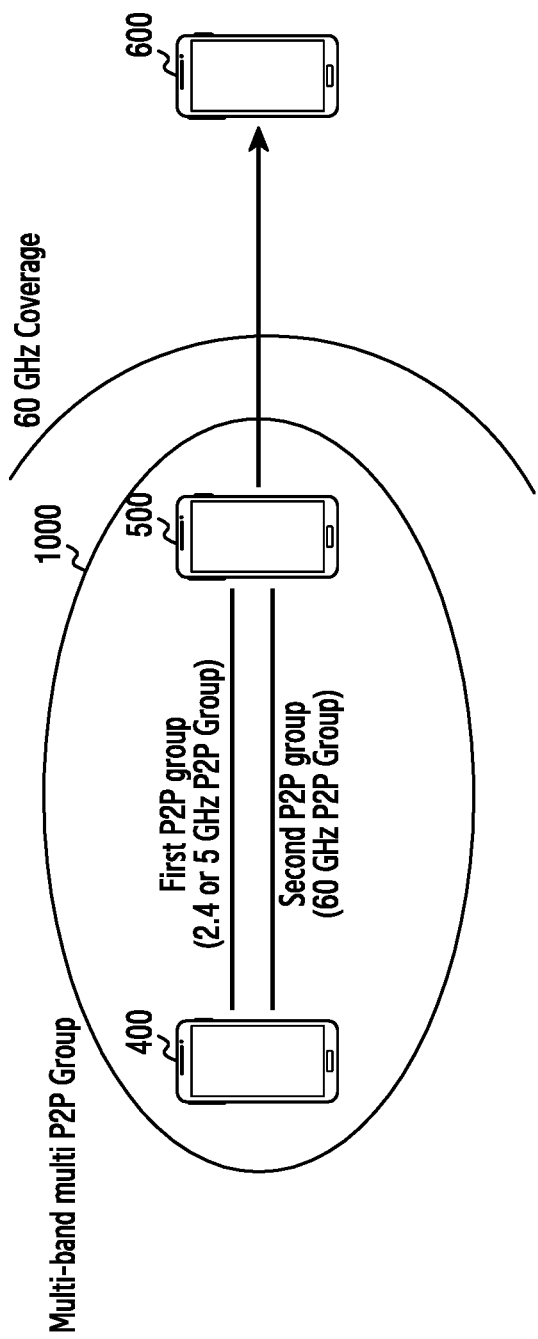

FIGS. 9 and 10 are views to illustrate examples of connecting a third electronic device according to various exemplary embodiments.

According to various exemplary embodiments, FIG. 9 illustrates an example of an operation of accepting a continuous 1:1 connection after a second P2P group of a second frequency band (for example, the 60 GHz band) is connected between two electronic devices (for example, an electronic device and at least one external electronic device). Hereinafter, the first electronic device 400 and the second electronic device 500 will be described as the electronic device and the at least one external electronic device for convenience of explanation, and the first electronic device 400 or the second electronic device 500 may be the electronic device 101 of FIG. 1 or the electronic device 201 of FIG. 2.

Referring to FIG. 9, the first electronic device 400 and the second electronic device 500 may be connected with each other as a second P2P group 900 within the coverage of the second frequency band (for example, the 60 GHz band).

According to one embodiment, when the second P2P group 900 is established by the first electronic device 400 and the second electronic device 500, a P2P discovery process may be performed by a third electronic device 600 for a new connection in addition to the electronic devices (for example, the first electronic device 400 and the second electronic device 500) of the second P2P group 900. For example, a discovery process for establishing a first P2P group may be performed by the third electronic device 600 with respect to the first electronic device 400 or the second electronic device 500 of the second P2P group 900.

According to another exemplary embodiment, in the state in which the second P2P group 900 is established, the first electronic device 400 or the second electronic device 500 may discover the third electronic device 600 (or at least one external electronic device of the second frequency band) entering the coverage of the second frequency band, and a P2P discovery process for a new connection with the third electronic device 600 in the second P2P group 900 may be performed. According to various exemplary embodiments, the third electronic device 600 may include a device which supports or does not support the second frequency band (for example, the 60 GHz band).

According to various exemplary embodiments, at least one electronic device of the electronic devices (for example, the first electronic device 400 and the second electronic device 500) connecting the second P2P group 900 may continuously maintain a state in which the at least one electronic device is discoverable by the third electronic device 600 in the first frequency band (for example, the 2.4 GHz/5 GHz band) (hereinafter, referred to as a discoverable state).

According to various exemplary embodiment, the electronic device (for example, the first electronic device 400 or the second electronic device 500) may maintain the discoverable state by maintaining a low-power discovery window (DW) in the first frequency band (for example, the 2.4 GHz/5 GHz band), or by maintaining a periodic listen state. For example, an electronic device (for example, the first electronic device 400) operating as a group owner of the second P2P group may serve to maintain the discoverable state. In another example, an electronic device (for example, the second electronic device 500) operating as a group client of the second P2P group may serve to maintain the discoverable state. In still another example, both the first electronic device 400 operating as the group owner of the second P2P group and the second electronic device 500 operating as the group client may serve to maintain the discoverable state.

According to various exemplary embodiments, when the second P2P group 900 is effective, the second P2P group 900 (for example, a connection based on the second frequency band) may maintain the discoverable state through the group owner of the second P2P group 900. According to various exemplary embodiments, the discoverable state in the first frequency band (for example, the 2.4 GHz/5 GHz band) may be maintained by at least one electronic device of the second P2P group 900, and in this case, the corresponding electronic device may operate in the listen state or may establish a low-power synchronization network. According to one embodiment, the group owner of the second P2P group 900 may maintain the discoverable state of the first frequency band.

According to various exemplary embodiments, by maintaining the discoverable state of at least one of the first electronic device 400 or the second electronic device 500, the third electronic device 600 which tries to newly connect to the first electronic device 400 or the second electronic device 500 of the second P2P group 900 may discover the second P2P group 900 through the P2P discovery process of the first frequency band (for example, the 2.4 GHz band).

For example, the third electronic device 600 may acquire multi-band information (for example, information on the second P2P group 900) on multiple frequency bands through the P2P discovery of the first frequency band. The third electronic device 600 may connect a new first P2P group (or the existing first P2P group, hereinafter, referred to as a third P2P group) with at least one of the first electronic device 400 or the second electronic device 500 discovered in the second P2P group 900 in the operation channel of the first frequency band (for example, the 2.4 GHz/5 GHz band). In another example, the third electronic device 600 may connect to the second P2P group 900 through an additional discovery of the second frequency band (for example, the 60 GHz band) as described above, or may select a group for data communication with the selectively connected corresponding electronic device (for example, the first electronic device 400 or the second electronic device 500).

According to various exemplary embodiments, when the third electronic device 600 which tries to newly connect does not support the second frequency band (for example, the 60 GHz band), the third electronic device 600 may maintain a third P2P group in the first frequency band (for example, the 2.4 GHz/5 GHz band) with the first electronic device 400 or the second electronic device 500 of the second P2P group 900. For example, the first electronic device 400 or the second electronic device 500 may maintain the multiple P2P group connection.

In certain embodiments, the first electronic device 400 may be the group owner of the second P2P group in the second frequency band, while the third P2P group in the first frequency band might include the first electronic device 400 and the third electronic device 600, wherein the third electronic device 600 is the group owner.

According to various exemplary embodiments, FIG. 10 illustrates an example of an operation of accepting a continuous 1:N connection when both the first P2P group of the first frequency band (for example, the 2.4 GHz/5 GHz band) and the second P2P group of the second frequency band (for example, the 60 GHz band) are managed between two electronic devices (for example, an electronic device and at least one external electronic device).

Referring to FIG. 10, the electronic device (for example, the first electronic device 400) and the at least one external electronic device (for example, the second electronic device 500) may be connected with each other as multiple P2P groups 1000 including the first P2P group in the coverage of the first frequency band and the second P2P group in the coverage of the second frequency band as described above.

According to one embodiment, in the state in which the first electronic device 400 and the second electronic device 500 establish the multiple P2P groups 1000, a P2P discovery process for at least one P2P group of the multiple P2P groups 1000 (for example, the first P2P group and the second P2P group) may be performed by the third electronic device 600 for a new connection, in addition to the electronic devices of the multiple P2P groups 1000 (for example, the first electronic device 400 and the electronic device 500). For example, a discovery process may be performed by the third electronic device 500 to establish the first P2P group or the second P2P group for the first electronic device 400 or the second electronic device 500 of the multiple P2P groups 1000.

According to another exemplary embodiment, in the state in which the multiple P2P groups 1000 are established, the first electronic device 400 or the second electronic device 500 may discover the third electronic device 600 (or at least one other external electronic device of the first frequency band or the second frequency band) entering the coverage of the first frequency band or the coverage of the second frequency band, and may perform a P2P discovery process for a new connection with the third electronic device 900. According to various exemplary embodiments, the third electronic device 600 may include a device which supports or does not support the second frequency band (for example, the 60 GHz band).

According to various exemplary embodiments, at least one electronic device of the electronic devices (for example, the first electronic device 400 and the second electronic device 500) connecting the multiple P2P groups 1000 may maintain a state in which the at least one electronic device is discoverable in each frequency band (hereinafter, referred to as a discoverable state). According to one embodiment, a corresponding electronic device serving as a group owner in each P2P group (for example, the first P2P group and the second P2P group) may maintain the discoverable state of each frequency band.

According to various exemplary embodiments, when all of the multiple P2P groups 1000 including the first P2P group and the second P2P group are effective, the first P2P group of the first frequency band (for example, the 2.4 GHz/5 GHz band) may maintain the discoverable state through the group owner of the first P2P group. In another example, the second P2P group of the second frequency band (for example, the 60 GHz band) may maintain the discoverable state through the group owner of the second P2P group. In this case, the corresponding electronic device may operate in the listen state or may establish a low-power synchronization network. According to one embodiment, the group owner of the second P2P group may maintain the discoverable state of the first frequency band. In this case, the electronic device of the group owner of each P2P group may be the same single electronic device or the electronic devices of the group owners of the P2P groups may be different electronic devices.

According to various exemplary embodiments, when the first P2P group is maintained and exists in a power save (PS) state, the first P2P group may be woken up to maintain the above-described discovery window (DW) and the listen state. According to various exemplary embodiments, the power save method may save a minimum time for transmitting beacons and maintain a sleep state by utilizing various power management techniques (for example, the opportunistic technique defined in the P2P standard or the NoA technique).

According to various exemplary embodiments, by maintaining the discoverable state of at least one of the first electronic device 400 or the second electronic device 500, the third electronic device 600 which tries to newly connect to the first electronic device 400 or the second electronic device 500 of the multiple P2P groups 1000 may acquire multi group information through the P2P discovery process of the first frequency band. The third electronic device 600 may establish a new first P2P group (or the existing first P2P group) with at least one of the first electronic device 400 or the second electronic device 500 discovered in the multiple P2P groups 1000 in the operation channel of the frequency band (for example, the 2.4 GHz band).

According to various exemplary embodiments, the third electronic device 600 may establish a new second P2P group (or the existing second P2P group) by discovering the second frequency band (for example, the 60 GHz band) as described above, or may select a group for data communication with a selectively connected corresponding electronic device.

Hereinafter, a case in which two electronic devices communicating with each other in the second frequency band (for example, the 60 GHz band) move apart from each other and move out of the coverage of the second frequency band (for example, the 60 GHz band) according to various exemplary embodiments will be described. However, this should not be considered as limiting. For example, the present disclosure may include a case in which, when the two electronic devices do not exist within the coverage of the second frequency band, the two electronic devices operate based on the first frequency band. In another example, when the communication band changes from the first P2P group of the first frequency band to the second P2P group of the second frequency band, the two electronic devices may operate.

Figure 11:
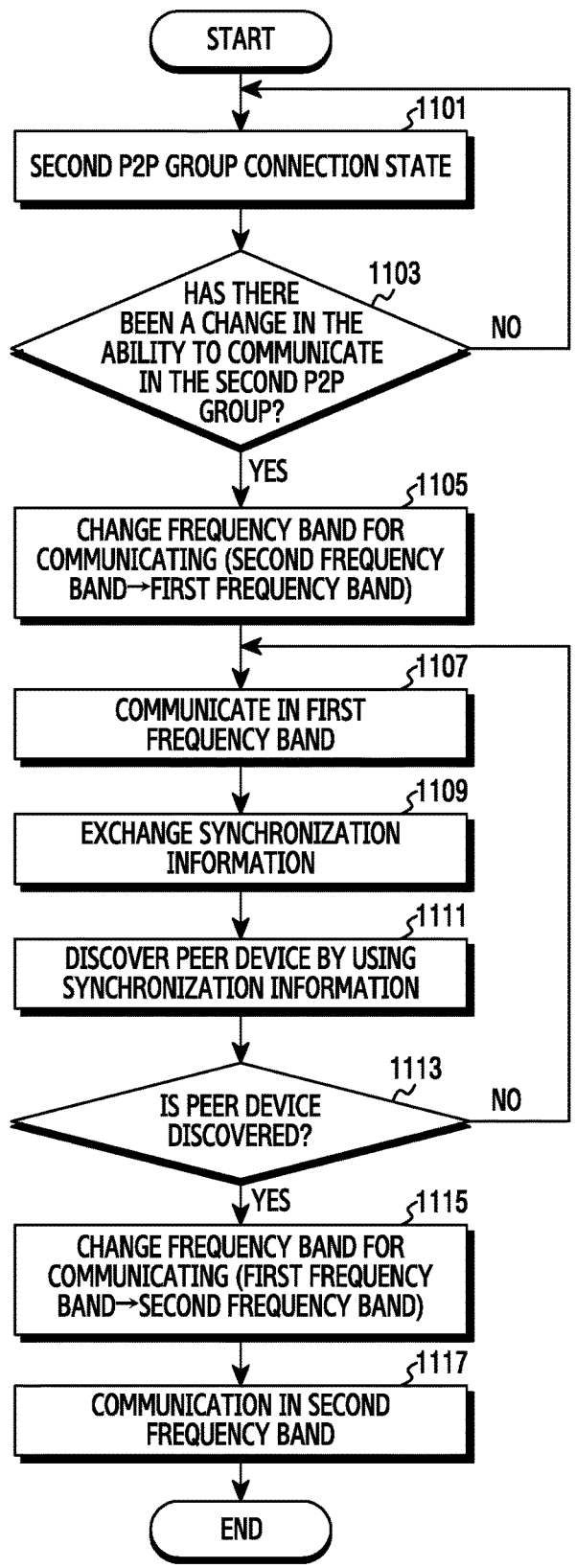
FIG. 11 is a flowchart showing a method for communicating by using multiple frequency bands in an electronic device according to various exemplary embodiments of the present disclosure.

FIG. 11 is a flowchart showing a method for communicating by using multiple frequency bands in an electronic device according to various exemplary embodiments of the present disclosure. FIG. 11 will be described with reference to FIG. 12.

Referring to FIG. 11, in operation 1101, the electronic device 400 may be in a state in which the electronic device 400 connects a second P2P group with at least one external electronic device. For example, the second P2P group of the second frequency band (for example, the 60 GHz band) may be established between the first electronic device 400 and the second electronic device 500 by using multi-band multi-group. According to various exemplary embodiments, after the second P2P group is established, the electronic device 400 may disconnect the first P2P group or may connect multiple groups and then maintain the first P2P group in the power save (PS) state.

In operation 1103, the processor 440 of the electronic device 400 may determine whether the ability to communicate using second P2P group has changed. This can occur, for example, when the second terminal 500 moves outside the coverage area of the second P2P group, e.g., the 60 GHz coverage area 1200, but remains within the coverage area of a first P2P group, e.g., the 2.4 GHz/5 GHz coverage area 1250.

Determining whether the ability to communicate using the second P2P group can occur in a number of ways. According to one embodiment, when a strength of a signal (for example, received signal strength indication (RSSI)) for a counterpart electronic device (for example, at least one external electronic device) in the communication of the second frequency band is less than or equal to a pre-defined reference value, the processor 440 may determine that the coverage is converted. According to another exemplary embodiment, the processor 440 may measure a distance to the counterpart electronic device in the communication of the second frequency band (for example, may measure a distance using technology such as 802.11mc or the like), and, when a distance longer than or equal to a pre-defined reference level is measured, the processor 400 may determine that the coverage is converted. According to another exemplary embodiment, when the counterpart electronic device communicating in the second frequency band is disconnected, the processor 440 may determine that the coverage is converted. According to various exemplary embodiments, the processor 440 may determine whether the coverage is converted or not based on at least one of the strength of a signal during the communication of the second frequency band, a distance, or information on a disconnection.

In operation 1103, when the change in the ability has not occurred (No in operation 1103), the processor 440 may return to operation 1101 to perform operations after operation 1101.

When the change has occurred in operation 1103 (Yes in operation 1103), the processor 440 may change the frequency band for communicating with the counterpart electronic device (for example, at least one external electronic device) in operation 1105. For example, the processor 440 may change the communication band from the second P2P group of the second frequency band (for example, the 60 GHz band) to the first P2P group of the first frequency band (for example, the 2.4 GHz/5 GHz).

According to one embodiment, when the first P2P group is disconnected when the second P2P group is established as in operation 1101 described above, the processor 440 may recover the connection of the first P2P group and change the communication frequency band (for example, the second frequency band→the first frequency band). According to one exemplary embodiment, when the first P2P group is maintained in the power save state when the second P2P group is established as in operation 1101 described above, the processor 440 may change the communication frequency band by waking up the power save state.

In operation 1107, the processor 440 may process communication in the first frequency band changed in operation 1105.

It is noted that although there has been a change in the ability to communication in the second P2P group, the change may be temporary. For example, electronic device 500 can move back into coverage area 1200. Accordingly, ability to communication using the second P2P group is monitored.

In operation 1109, the processor 440 may exchange synchronization information for discovering the second frequency band in sequence after communicating in the first frequency band which is changed in operation 1105, or in parallel with the communicating. According to various exemplary embodiments, the processor 440 may change the communication frequency band to the first P2P group and may share a discovery window (DW) or a listen time for a low-power discovery in the second frequency band in a similar method to the above-described discovery process. According to various exemplary embodiments, the processor 440 may establish a new neighbor awareness networking (NAN) cluster in a specific channel defined with the counterpart electronic device, or, when a NAN cluster already exists nearby, the processor 440 may maintain the discovery window (DW) by sharing corresponding cluster information.

In operation 1111, the processor 440 may discover a peer device using the synchronization information.

In operation 1113, the processor 440 may determine whether a peer device is discovered or not based on the result of the discovering in operation 1111. According to various exemplary embodiments, the processor 440 may determine whether the electronic device is restored to the coverage of the second frequency band with the counterpart electronic device by performing a low-power discovery based on the second frequency band, in addition to the first P2P group communication of the first frequency band.

In operation 1113, when the peer device is not discovered (No in operation 1113), the processor 440 may return to operation 1107 to process operations after operation 1107.

When the peer device is discovered in operation 1113 (Yes in operation 1113), the processor 440 may change the frequency band for communicating with the counterpart electronic device in operation 1115. For example, the processor 440 may change the communication band from the first P2P group of the first frequency band (for example, the 2.4 GHz/5 GHz band) to the second P2P group of the second frequency band (for example, the 60 GHz band). According to one embodiment, when the coverage with the counterpart electronic device is identified as the second frequency band, the processor 440 may restore the second P2P group again and change the communication frequency band (for example, the first frequency band→the second frequency band). According to various exemplary embodiments, the processor 440 may disconnect the connection of the first P2P group or may maintain the multiple groups by changing to the power save state.

Figure 12:
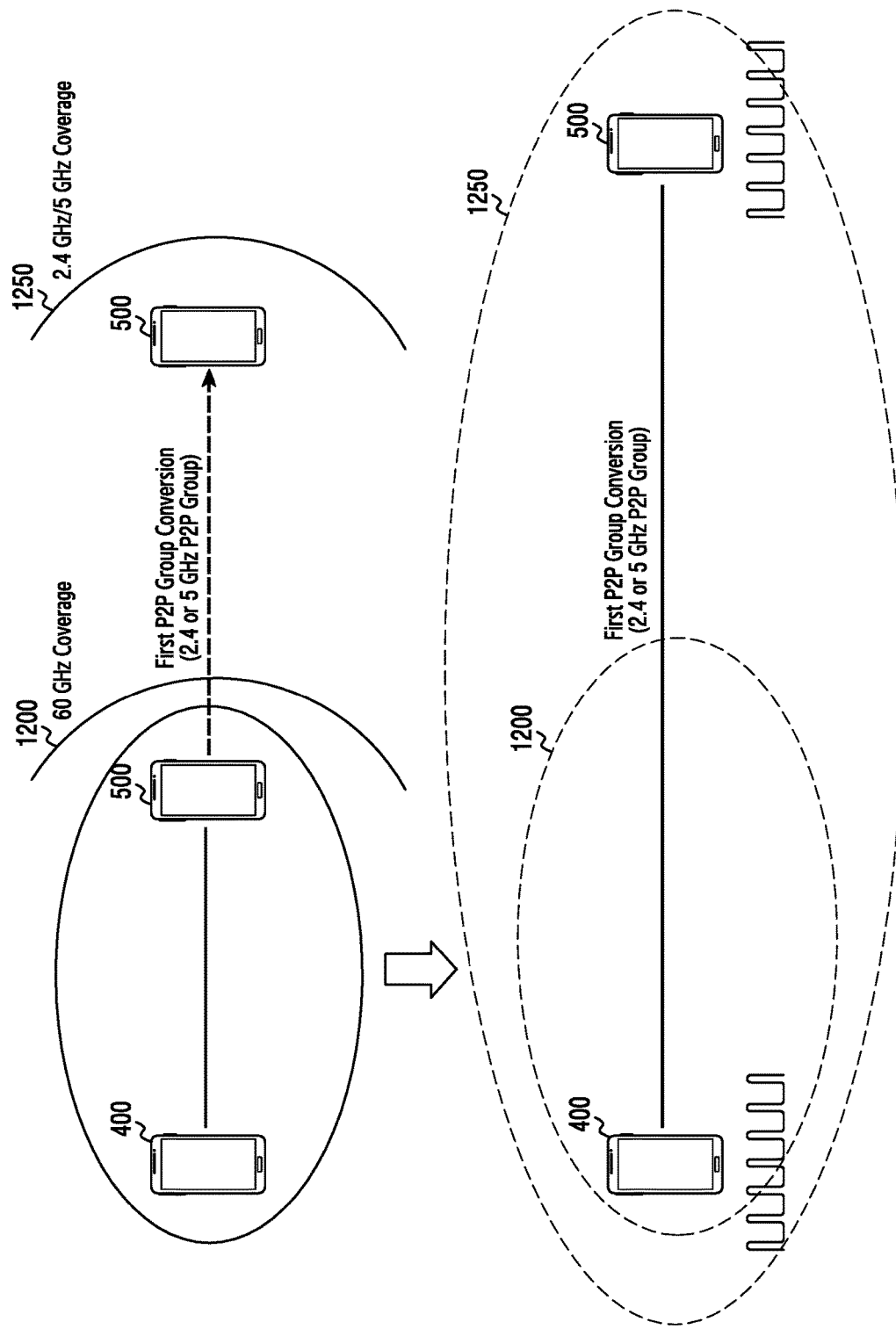
FIG. 12 and FIG. 13 are views showing an example of connecting multiple frequency bands in an electronic device according to various exemplary embodiments of the present disclosure.
Figure 13:
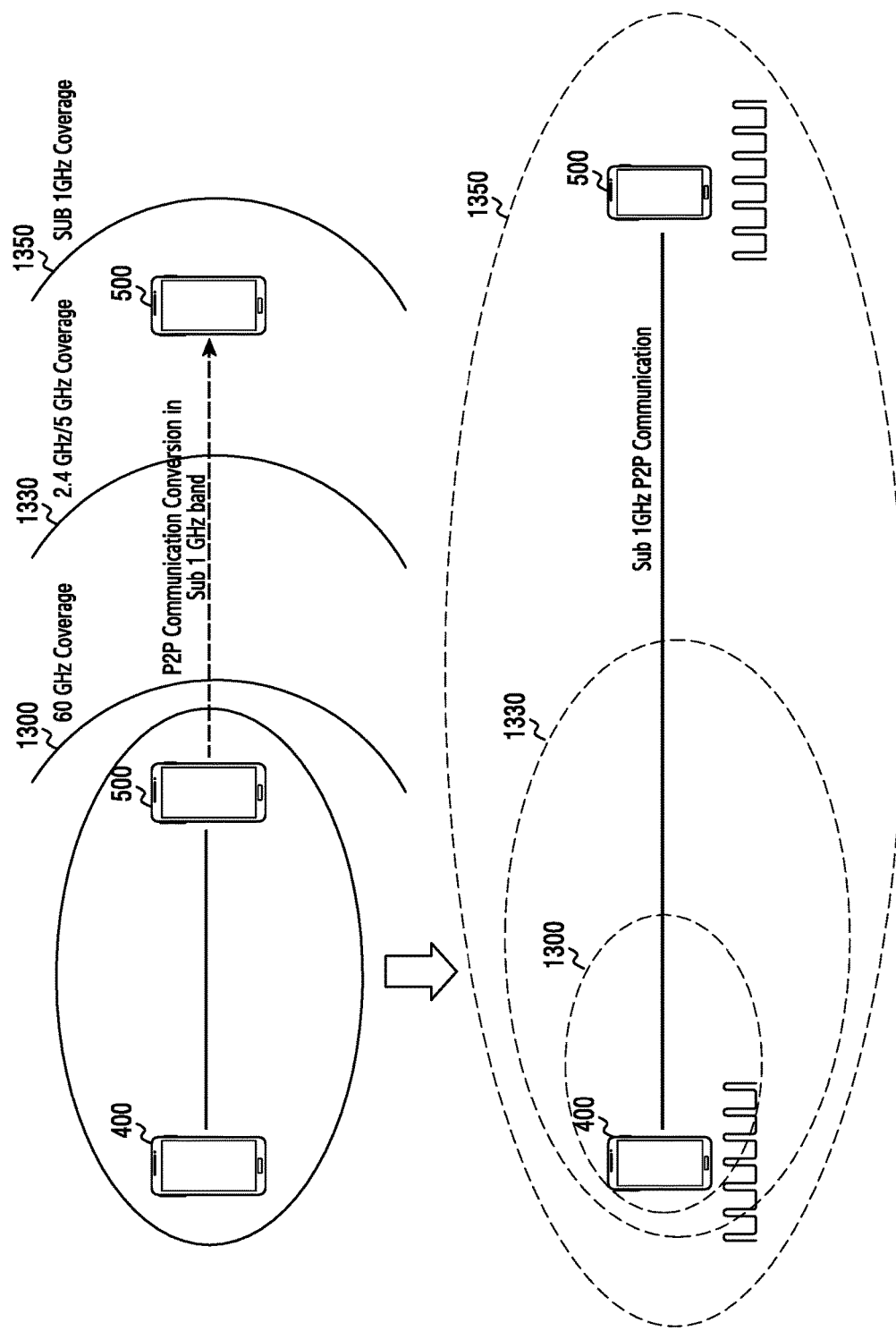

FIGS. 12 and 13 are views to illustrate an example of connecting multiple frequency bands in an electronic device according to various exemplary embodiments of the present disclosure.

Referring to FIG. 12, FIG. 12 illustrates an example of an operation caused by a coverage change between the first frequency band (for example, the 2.4 GHz/5 GHz band) and the second frequency band (for example, the 60 GHz). As described above, after the communication of the second frequency band is established by utilizing multi-band multi-group between the first electronic device 400 and the second electronic device 500, the first P2P group may be disconnected or may be maintained in the power save state.

According to various exemplary embodiments, when the strength of a signal (for example, the RSSI) in the communication of the second frequency band is less than or equal to a reference value, when a distance longer than or equal to a reference value is measured by technology of 802.11 mc, or when the connection with the counterpart electronic device is disconnected, the first electronic device 400 and the second electronic device 500 may change the communication band from the second P2P group to the first P2P group. According to one embodiment, the second electronic device 500 may leave a coverage 1200 of the second frequency band and may be located within a coverage 1250 of the first frequency band.

According to various exemplary embodiments, when the first P2P group is disconnected, the first electronic device 400 and the second electronic device 500 may restore the connection. According to various exemplary embodiments, the first electronic device 400 and the second electronic device 500 may wake up the connection of the first P2P group when the connection is simply maintained in the power save state.

According to various exemplary embodiments, the first electronic device 400 and the second electronic device 500 may change the communication band to the first P2P group and then may share synchronization information (for example, a discovery window (DW), a listen time, or the like) for a low-power discovery in the second frequency band. According to various exemplary embodiments, the first electronic device 400 and the second electronic device 500 may configure a new NAN cluster in a specific channel defined by the first electronic device 400 and the second electronic device 500, or when there already exists a NAN cluster, the first electronic device 400 and the second electronic device 500 may maintain the discovery window (DW) by sharing corresponding cluster information.

According to various exemplary embodiments, the first electronic device 400 and the second electronic device 500 may determine whether the coverage 1200 of the second frequency band is restored between the two electronic devices 400 and 500 by performing the low-power discovery in the second frequency band in addition to the first P2P group communication. For example, when the coverage between the two electronic devices 400 and 500 is identified as the coverage 1200 of the second frequency band, the first electronic device 400 and the second electronic device 500 may restore the second P2P group and change the communication channel (for example, the first frequency band→the second frequency band). According to various exemplary embodiments, the first electronic device 400 and the second electronic device 500 may disconnect the connection of the first P2P group or may maintain multiple groups by changing to the power save state.

Referring to FIG. 13, FIG. 13 illustrates an example of an operation caused by a coverage change between the first frequency band (for example, the 2.4 GHz/5 GHz) and the third frequency band (for example, the sub 1 GHz band). For example, according to various exemplary embodiments, the frequency band for communication may be changed in a corresponding method as described above with reference to FIGS. 11 and 12, according to not only a conversion between the first frequency band and the second frequency band, but also a conversion among the first to the third frequency bands.

According to various exemplary embodiments, the second electronic device 500 may leave the coverage 1300 of the second frequency band (for example, the 60 GHz band) and may be located within the coverage 1330 of the first frequency band (for example, the 2.4 GHz/5 GHz band), and may leave the coverage 1330 of the first frequency band and may be located within the coverage 1350 of the third frequency band (for example, the sub 1 GHz band). It is noted that the coverage are for the sub 1 GHz band are considerably higher than the 2.4/5 GHz frequency band, such as 1 Km/3300 ft.

For example, the first electronic device 400 and the second electronic device 500 may change the communication band to the third P2P group and then may share synchronization information (for example, a discovery window (DW), a listen time, or the like) for a low-power discovery in the first frequency band or the second frequency band. In another example, the first electronic device 400 and the second electronic device 500 may configure a new NAN cluster in a specific channel defined by the first electronic device 400 and the second electronic device 500, and, when there already exists a NAN cluster nearby, the first electronic device 400 and the second electronic device 500 may maintain the discovery window (DW) by sharing corresponding cluster information.

According to various exemplary embodiments, when the coverage between the two electronic devices 400 and 500 is identified as the coverage 1330 of the first frequency band or the coverage 1300 of the second frequency band, the first electronic device 400 and the second electronic device 500 may restore the first P2P group or the second P2P group again and may change the communication channel (for example, the third frequency band→the first frequency band or the third frequency band→the second frequency band).

As shown in the example of FIG. 13, a conversion scenario according to various exemplary embodiments may be applied among the second frequency band (the 60 GHz band)↔the first frequency band (2.4 GHz/5 GHz band)↔the third frequency band (the sub 1 GHz band). For example, according to various exemplary embodiments, a conversion operation may be performed between different frequency bands like the first frequency band (2.4 GHz/5 GHz band), the second frequency band (60 GHz band), and the third frequency band (sub 1 GHz band).

According to various exemplary embodiments, as an example of a communication management method between multiple frequency bands, multiple clusters of NAN may be utilized. For example, in recent years, low-power discovery technology known as NAN is developed in the WiFi standards, and the development of proximity services using this technology is ongoing. The NAN refers to technology that synchronizes time clocks among electronic devices existing in the NAN cluster, and allows the electronic devices to exchange beacons and service discovery frames with each other in the same discovery window (DW) section.

The discovery window (DW) may indicate a time at which the electronic device is woken (for example, millisecond) and may cause high current consumption, whereas sections other than the discovery window (DW) may allow the electronic device to maintain the sleep state and thus enable a low-power discovery. For example, the electronic device may consume less current even if it always maintains the discoverable state, and may be advantageous to exchanging information with neighbor devices, and thus may perform various application service operations. For example, a NAN network may include NAN electronic devices which use a set of the same NAN parameters (for example, a time interval between continuous discovery windows (DWs), a section of a discovery window (DW), a beacon interval, or a NAN channel, or the like). The NAN electronic device may compose the NAN cluster. Herein, the NAN cluster may use a set of the same NAN parameters and may indicate a set of NAN devices which are synchronized with one another according to the same discovery window schedule.

According to one embodiment, WiFi devices supporting NAN technology may be synchronized with one another with respect to time clocks, such that discovery windows (DWs) can be activated at the same time, and the WiFi devices may exchange synchronization beacons and service discovery frames in the discovery windows (DWs) with one another. The synchronization beacon transmitted in the discovery window (DW) may include information for synchronizing with the NAN cluster, and the NAN devices receiving the synchronization beacon may serve to maintain synchronization. For example, when discovery beacons are transmitted between the discovery windows (DWs), other electronic device which do not still join the NAN cluster may use the discovery beacons to recognize information of the NAN cluster and synchronization information through passive scan.

In various exemplary embodiments, the electronic device is not limited to the case in which service discovery frames are exchanged only in a discovery window (DW). For example, the electronic device may designate an active time section between the discovery windows (DWs), and may perform an additional a service discovery during this section. In another example, an operation for WiFi Direct, mesh, IBSS, and WLAN connection in addition to the additional service discovery may be designated between additional discovery windows (DWs), and may be utilized as a process for connecting to and discovering WiFi.

In the following description (for example, FIGS. 14 and 15), an NAN cluster in the sub 1 GHz band based on 802.11ah, which supports the longest distance (for example, has the largest coverage) and has a low-power characteristic, is assumed to be (named) a first frequency band, and an NAN cluster of the 2.4 GHz/5 GHz having the next largest coverage is assumed to be (named) a second frequency band. According to various exemplary embodiments, the electronic device 400, which will be described below, may indicate an NAN device supporting NAN.

Figure 14:
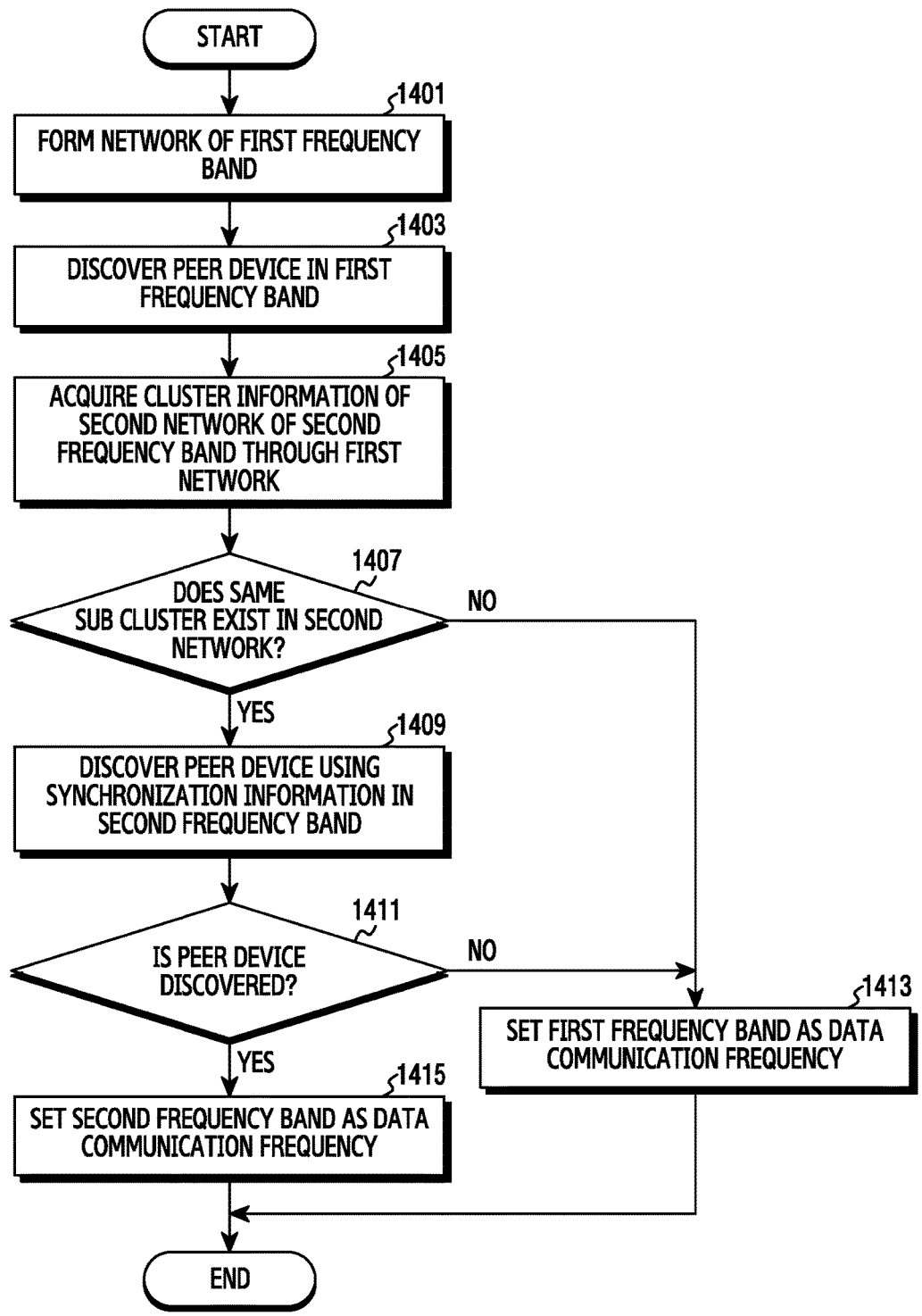
FIG. 14 is a flowchart showing a method for communicating data by using multiple neighbor awareness networking (NAN) clusters in an electronic device according to various exemplary embodiments of the present disclosure.

FIG. 14 is a flowchart showing a method for communicating data by using multiple NAN clusters in an electronic device according to various exemplary embodiments of the present disclosure.

Referring to FIG. 14, in operation 1401, the processor 440 of the electronic device 400 may establish a first network based on the first frequency band (for example, sub 1 GHz). For example, the processor 440 may establish an NAN synchronization network (or cluster) (hereinafter, referred to as a first network) by utilizing the first frequency band.

In operation 1403, the processor 440 may discover a peer device (for example, at least one external electronic device) based on the first frequency band. According to various exemplary embodiments, the processor 440 may discover another external electronic device which desires data communication by using the first network (or cluster). According to one exemplary embodiment, the first electronic device 400 and the second electronic device 500 may discover each other through a sub 1 GHz NAN cluster.

In operation 1405, the processor 440 may acquire cluster information of a second network of the second frequency band (for example, 2.4 GHz/5 GHz band) through the first network 1500. According to one embodiment, the first electronic device 400 and the second electronic device 500 may exchange cluster information for establishing a synchronization network (sub cluster) (hereinafter, referred to as a second network) of the second frequency band in the discovery window (DW) of the NAN cluster of the first frequency band. The cluster information may include, for example, a network ID of the second frequency band network, a cluster ID, or a sub cluster ID (for example, a synchronization beacon ID).

In operation 1407, the processor 440 may determine whether there exists the same sub cluster in the second network. For example, the processor 440 may determine whether there exists an electronic device having the same sub cluster ID in the second network based on the cluster information.

When there does not exist the same sub cluster in the second network in operation 1407 (No in operation 1407), the processor 440 may set the first frequency band as a data communication frequency in operation 1413.

Whether there exists the same sub cluster in the second network in operation 1407 (Yes in operation 1407), the processor 440 may discover a peer device by using synchronization information in the second frequency band in operation 1409.

In operation 1411, the processor 440 may determine whether a peer device is discovered or not based on the result of the discovering the peer device.

When the peer device is not discovered in operation 1411 (No in operation 1411), the processor 440 may set the first frequency band as a data communication frequency in operation 1413.

When the peer device is discovered in operation 1411 (Yes in operation 1411), the processor 440 may set the second frequency band as a data communication frequency in operation 1415.

Figure 15:
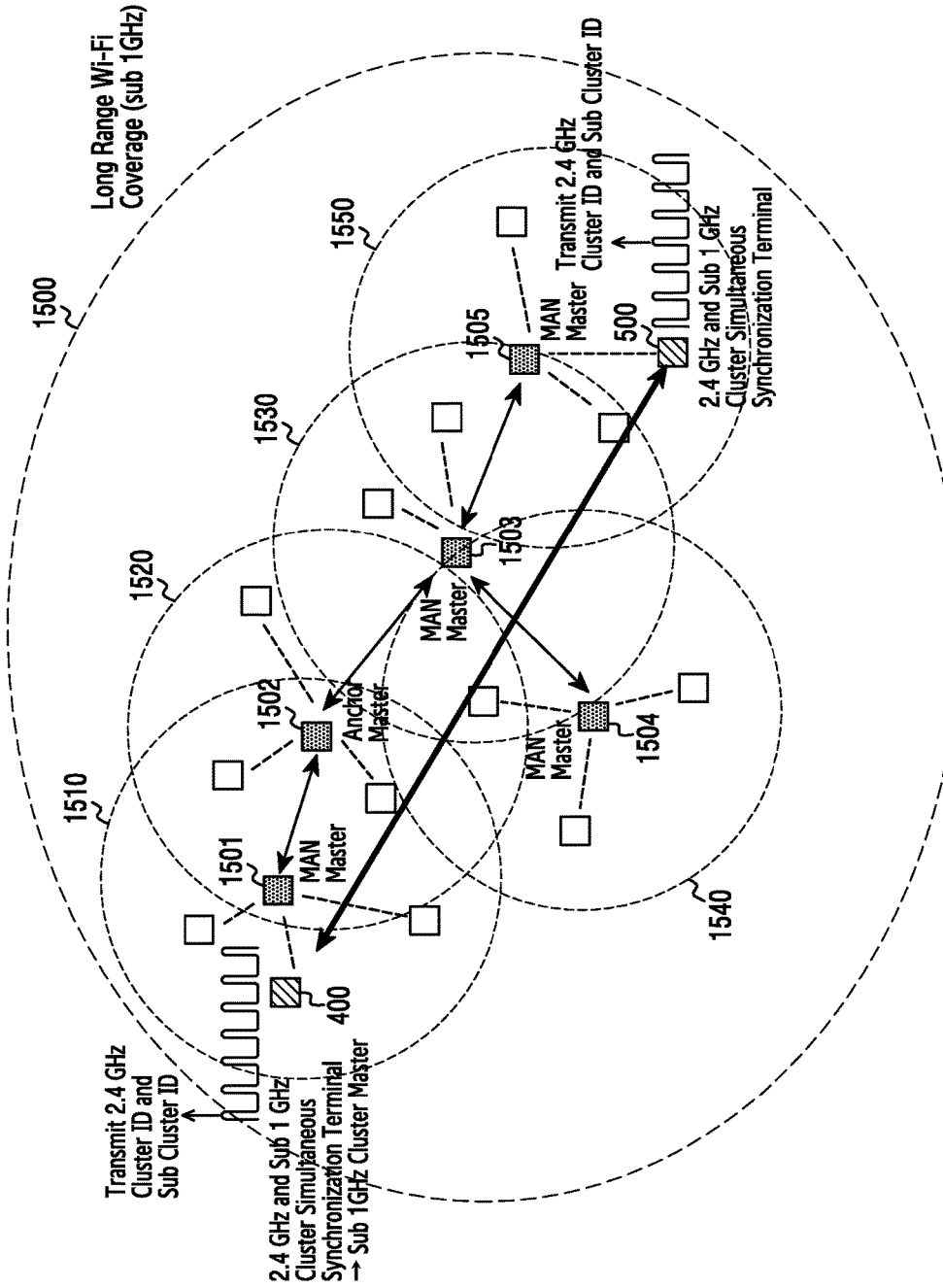
FIG. 15 is a view showing an example of a method for communicating data by using multiple NAN clusters in an electronic device according to various exemplary embodiments of the present disclosure.

FIG. 15 is a view showing an example of a method for communicating data through multiple NAN clusters in an electronic device according to various exemplary embodiments of the present disclosure.

As shown in FIG. 15, at least one NAN device 1501, 1502, 1503, 1504, 1505 may establish an NAN synchronization network (or cluster) 1500 by utilizing the first frequency band (for example, the sub 1 GHz band). According to various exemplary embodiments, another external electronic device which desires data communication may be discovered by utilizing the cluster 1500. For example, the first electronic device 400 and the second electronic device 500 in FIG. 15 may discover each other through the sub 1 GHz NAN cluster 1500 (operation 1403).

Referring to FIG. 15, the first electronic device 400 and the second electronic device 500 may exchange cluster information for establishing a synchronization network of the second frequency band (for example, the 2.4 GHz band) in the discovery window (DW) of the NAN cluster 1500 of the first frequency band. For example, the first electronic device 400 and the second electronic device 500 may have been synchronized with a nearby NAN cluster 1510, 1550 of the second frequency band (for example, the 2.4 GHz band) (operation 1405).

According to various exemplary embodiments, the first electronic device 400 and the second electronic device 500 may share information of the NAN cluster 1510, 1550 currently synchronized. According to various exemplary embodiments, the shared cluster information may define, for example, at least one of an NAN network ID, a cluster ID, or a sub cluster ID, and may be shared.

According to various exemplary embodiments, the NAN clusters 1510, 1520, 1530, 1540, 1550 of the second frequency band may have small coverages in comparison to the cluster 1500 of the first frequency band, and thus may be located at different hops even when the NAN clusters exist in the same cluster 1500. According to one embodiment, one NAN cluster may expand clusters by hopping many times through masters (for example, NAN devices 1501, 1502, 1503, 1504, 1505) and non-master syncs (for example, neighbor NAN devices connected with the masters of the NAN clusters 1510, 1520, 1530, 1540, 1550) with reference to an anchor master (for example, the NAN device 1502 of the NAN cluster 1520). For example, the first electronic device 400 and the second electronic device 500 may have the same cluster ID, but may actually exist in regions where communication is impossible (for example, the cluster 1510, the cluster 1550). On the other hand, the first electronic device 400 and the second electronic device 500 may easily determine that the first electronic device 400 and the second electronic device 500 belong to the same coverage 1500 through the sub cluster ID by sending the cluster IDs of the hops that the first electronic device 400 and the second electronic device 500 belong to. According to various exemplary embodiments, the sub cluster ID may include, for example, a synchronization beacon ID that is sent by the master or the non-master sync of each hop.

In FIG. 15, according to various exemplary embodiments, the first electronic device 400 and the second electronic device 500 already establish NAN clusters of the second frequency band (for example, the 2.4 GHz band), but the first electronic device 400 and the second electronic device 500 may not use the NAN clusters of the second frequency band or may not be synchronized with each other. For example, when the first electronic device 400 and the second electronic device 500 are synchronized with each other according to the first frequency band (for example, the sub 1 GHz band), the first electronic device 400 and the second electronic device 500 may start NAN cluster synchronization of the second frequency band, and establish a NAN cluster in the second frequency band by sharing second frequency synchronization network information (for example, cluster information) established by one of the first electronic device 400 and the second electronic device 500.

According to various exemplary embodiments, the first electronic device 400 and the second electronic device 500 may determine whether synchronization beacons having the same cluster ID or sub cluster ID in the discovery window (DW) are received through the NAN cluster information of the second frequency band shared by the first electronic device 400 and the second electronic device 500. According to various exemplary embodiments, the first electronic device 400 and the second electronic device 500 may recognize whether the first electronic device 400 and the second electronic device 500 exist in the same hop of the same NAN cluster through the same cluster ID or sub cluster ID without direct communication between the first electronic device 400 and the second electronic device 500.

According to various exemplary embodiments, when it is recognized that the first electronic device 400 and the second electronic device 500 exist in the same cluster or the same hop, the first electronic device 400 and the second electronic device 500 may discover each other by exchanging a message for discovering in the discovery window (DW).

According to various exemplary embodiments, when the first electronic device 400 and the second electronic device 500 are discovered by each other through the NAN cluster of the second frequency band, the first electronic device 400 and the second electronic device 500 may trigger data communication (for example, NAN data path (NAN data link), WiFi Direct, IBSS, mobile hotspot, or the like) through a post operation based on the second frequency band, and may use the data communication. On the other hand, when the first electronic device 400 and the second electronic device 500 are not discovered in the second frequency band, the first electronic device 400 and the second electronic device 500 may use data communication in the first frequency band.

In FIG. 15, a frequency band of sub 1 GHz supporting a long distance is set as a first frequency, and the 2.4 GHz band is set as a second frequency. However, the reverse case is possible in various exemplary embodiments. For example, a NAN cluster of the 2.4 GHz band may be established and the NAN cluster information of the sub 1 GHz band may be shared between the first electronic device 400 and the second electronic device 500. In this case, the coverage of the sub 1 GHz band is larger than the that of the 2.4 GHz band, such that synchronization can be promptly performed.

According to various exemplary embodiments, the clusters of the two different bands (for example, the first frequency band, the second frequency band) are managed simultaneously, such that a seamless inter-coverage conversion and data communication can be performed as described above.

In the example of FIG. 15, a method of managing multiple NAN clusters in the two frequency bands has been described. For example, in FIG. 15, only the 2.4 GHz band and the sub 1 GHz band has been described, but according to various exemplary embodiments, it is possible to expand a NAN cluster of the 60 GHz band. In this case, three or more NAN clusters may be operated.

Figure 16:
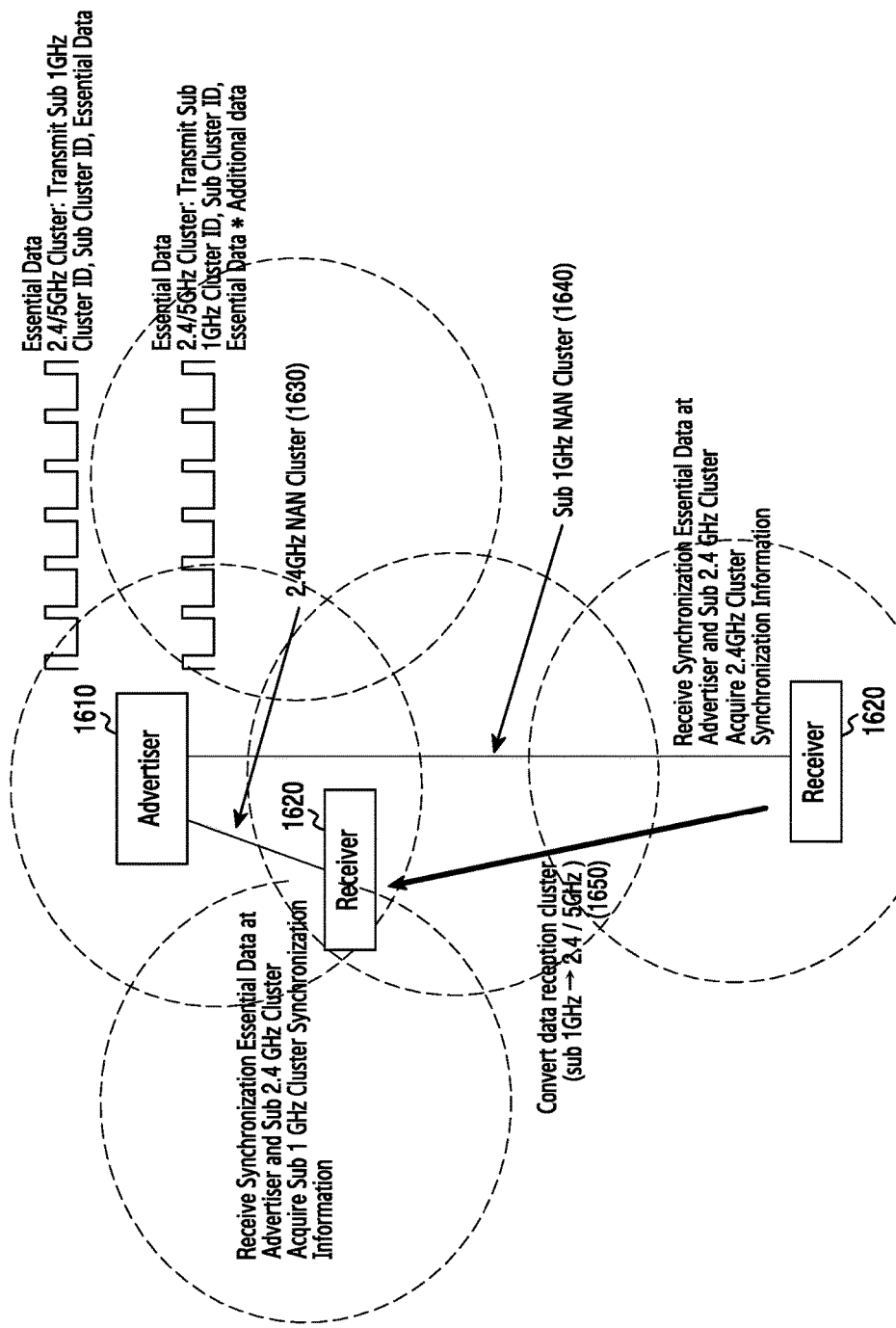
FIG. 16 is a view showing an example of servicing through NAN clusters of multiple frequency bands according to various exemplary embodiments of the present disclosure.

FIG. 16 is a view to illustrate an example of servicing through NAN clusters of multiple frequency bands according to various exemplary embodiments of the present disclosure.

Referring to FIG. 16, an advertiser 1610 (for example, a beacon) may generate NAN clusters 1630, 1640 of two frequency bands (for example, the 2.4 GHz band, the sub 1 GHz band) simultaneously, and may transmit different service data in discovery windows (DWs) of the clusters 1630, 1640.

According to one embodiment, the advertiser 1610 may include essential data for a service in service data of the NAN cluster 1640 of the sub 1 GHz band which has a long distance coverage and has a slow transmission speed, and include essential data and other additional service data in the NAN cluster 1630 of the 2.4 GHz band which enables more data to be transmitted.

According to one exemplary embodiment, the advertiser 1610 may include cluster synchronization information of other frequency bands in service data transmitted in the cluster 1630, 1640 of each frequency band, and transmit the cluster synchronization information, and an electronic device (for example, a receiver 1620) which receives the cluster synchronization information may use the cluster synchronization information to be selectively synchronized.

According to various exemplary embodiments, the receiver 1620 which is synchronized through the sub 1 GHz band first at a long distance may acquire the synchronization information of the 2.4 GHz band with the service data simultaneously, and may discover a synchronization network of the 2.4 GHz band. When it is determined that the advertiser 1610 exists in the cluster 1630 of the 2.4 GHz band as the result of the discovering, the receiver 1620 may convert a reception cluster of the service data. According to one embodiment, the receiver 1620 may convert the data reception cluster from the cluster 1640 of the sub 1 GHz band to the cluster 1630 of the 2.4 GHz band as shown in the example of operation 1650.

According to various exemplary embodiments, the service using the NAN clusters of the multiple frequency bands may be utilized in a scenario where an advertisement or brief information for explaining is transmitted by the advertiser 1610 in a store or a museum through a long distance, and detailed information is transmitted through a short distance.

According to various exemplary embodiments, a method for operating of an electronic device may include: establishing a connection with at least one external electronic device based on a first frequency band; determining whether it is possible to establish a connection with the at least one external electronic device based on a second frequency band; when it is not possible to establish a connection with the at least one external electronic device based on the second frequency band according to the determining, performing data communication with the at least one external electronic device based on the first frequency band; and, when it is possible to establish a connection with the at least one external electronic device based on the second frequency band, performing data communication with the at least one external electronic device based on the second frequency band.

According to various exemplary embodiments, the determining whether a connection with the at least one external electronic device is possible established may include: exchanging synchronization information of the second frequency band with the at least one external electronic device, and determining whether it is possible to establish a connection based on the second frequency band based on at least a part of the synchronization information.

According to various exemplary embodiments, the synchronization information may include at least one piece of information of a discovery channel and a discovery window for discovering.

According to various exemplary embodiments, the determining whether a connection with the at least one external electronic device is possible established may include performing a low-power discovery based on the second frequency band through a low-power discovery window shared with the at least one external electronic device.

According to various exemplary embodiments, the method may further include, when it is not possible to establish a connection with the at least one external electronic device based on the second frequency band, processing data communication based on the first frequency band, and performing a low-power discovery for discovering the at least one external electronic device based on the second frequency band according to a predetermined period.

According to various exemplary embodiments, the method may further include, when a connection with the at least one external electronic device is established based on the second frequency band, selecting at least one connection for data communication from among a connection based on the first frequency band and a connection based on the second frequency band in consideration of a data transmission state.

According to various exemplary embodiments, the method may further include, when a connection based on the second frequency band is established, disconnecting a connection based on the first frequency band or maintaining the connection based on the first frequency band in a power save state.

According to various exemplary embodiments, the first frequency band may have a coverage larger than that of the second frequency band.

According to various exemplary embodiments, the first frequency band may include a 2.4 GHz/5 GHz band, and the second frequency band may include a 60 GHz band.

According to various exemplary embodiments, the method may further include: performing wireless communication with the at least one external electronic device based on a third frequency band; and controlling a conversion among the second frequency band, the first frequency band, and the third frequency band.

According to various exemplary embodiments, the first frequency band may have a coverage larger than that of the second frequency band, and the third frequency band may have a coverage larger than that of the first frequency band. The third frequency band may include a sub 1 GHz band.

According to various exemplary embodiments, the method may further include: when at least one connection is established from among a connection based on the first frequency band or a connection based on the second frequency band, determining whether it is possible to establish a connection with a new external electronic device based on the first frequency band or the second frequency band; and establishing a connection with the new external electronic device based on the first frequency band or the second frequency band according to the determining.

As described above, according to the electronic device and the operating method thereof according to various exemplary embodiments, short-range communication and long-range communication can be efficiently managed by utilizing different frequency bands, simultaneously, in the electronic device which supports multiple frequency bands. According to various exemplary embodiments, inter-coverage data communication may be efficiently performed by utilizing multiple frequency bands in a WiFi network simultaneously. For example, according to various exemplary embodiments, the WiFi Direct technology utilizing the 802.11ad and 2.4 GHz/5 GHz band, or the NAN (WiFi Aware) technology may utilize multiple frequency bands for enhancing efficiency while maintaining compatibility with existing technology. Through this, the electronic device can support a movement between coverages more efficiently and with low power, and as a result, the usability and communication efficiency of the electronic device can be enhanced.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 140, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

While specific embodiments have been described in the detailed descriptions of the present disclosure, various changes can be made within a limit without departing from the scope of the present disclosure. Therefore, the scope of the present disclosure should not be limited to and defined by the above-described exemplary embodiments, and should be defined not only by the appended claims but also by the equivalents to the scopes of the claims.

What is claimed is:

1. An electronic device comprising:
a first wireless communication circuit configured to communicate based on a first frequency band;
a second wireless communication circuit configured to communicate based on a second frequency band;
a third wireless communication circuit configured to perform wireless communication with at least one external electronic device based on a third frequency band; and
a processor functionally connected with the first wireless communication circuit and the second wireless communication circuit, the processor configured to:
discover the at least one external electronic device based on the first frequency band by using the first wireless communication circuit;
establish a wireless connection with the at least one external electronic device based on the first frequency band by using the first wireless communication circuit;
determine whether the at least one external electronic device is discovered based on the second frequency band, during establishment of the wireless connection with the at least one external electronic device based on the first frequency band;
when the at least one external electronic device is not discovered based on the second frequency band, perform data communication with the at least one external electronic device based on the first frequency band; and
when the at least one external electronic device is discovered based on the second frequency band, perform data communication with the at least one external electronic device based on the second frequency band,
wherein the processor is further configured to control a conversion among the second frequency band, the first frequency band, and the third frequency band, and
wherein the first frequency band has a coverage larger than that of the second frequency band, and the third frequency band has a coverage larger than that of the first frequency band.

2. The electronic device of claim 1, wherein the processor is configured to exchange synchronization information of the second frequency band with the at least one external electronic device using the first frequency band, and determine whether the at least one external electronic device is discovered through the second frequency band based on at least a part of the synchronization information,
wherein the synchronization information includes an identification of a discovery channel and a discovery window.

3. The electronic device of claim 2, wherein the processor is further configured to:
establish a Wi-Fi (Neighbor Awareness Networking) NAN cluster using the discovery window and discovery channel; and
exchanging at least one service discovery frame using the discovery channel during the discovery window;
wherein determining whether the at least one external electronic device is discovered through the second frequency band is based on the at least one service discovery frame.

4. The electronic device of claim 1, wherein the processor is configured to perform a low-power discovery based on the second frequency band through a low-power discovery window shared with the at least one external electronic device.

5. The electronic device of claim 1, wherein the processor is configured to:
when the at least one external electronic device is discovered based on the second frequency band, process data communication based on the first frequency band, and perform a low-power discovery for discovering the at least one external electronic device based on the second frequency band according to a predetermined period.

6. The electronic device of claim 1, wherein the processor is configured to:
when the at least one external electronic device is discovered based on the second frequency band, control the second wireless communication circuit to establish a wireless connection with the at least one external electronic device based on the second frequency band, select at least one wireless connection for data communication from among the wireless connection based on the first frequency band and the wireless connection based on the second frequency band in consideration of a data transmission state.

7. The electronic device of claim 6, wherein the processor is configured to:
when the wireless connection based on the second frequency band is established, disconnect the wireless connection based on the first frequency band or maintain the wireless connection based on the first frequency band in a power save state.

8. The electronic device of claim 1, wherein the processor is configured to:
when at least one wireless connection is established from among the wireless connection based on the first frequency band or the wireless connection based on the second frequency band, determine whether it is possible to establish a wireless connection with a new external electronic device based on the first frequency band or the second frequency band, and
establish a wireless connection with the new external electronic device based on a one of the first frequency band or the second frequency band when it is possible to establish the wireless connection.

9. The electronic device of claim 1, wherein establishing the wireless connection with the at least one external electronic device using the first band comprises:
establishing a cluster with the first frequency band; and
discovering the at least one external electronic device in the cluster.

10. The electronic device of claim 9, further comprising exchanging information for establishing a sub cluster for the second frequency band, in a discovery window of the cluster.

11. A method for operating of an electronic device, the method comprising:
discovering at least one external electronic device based on a first frequency band by using a first wireless communication circuit;
establishing a wireless connection with the at least one external electronic device using the first frequency band;
determining whether the at least one external electronic device is discovered using a second frequency band during establishment of the wireless connection with the at least one external electronic device using the first frequency band;
when the at least one external electronic device is not discovered using the second frequency band, performing data communication with the at least one external electronic device based on the first frequency band; and
when the at least one external electronic device is discovered using the second frequency band, performing data communication with the at least one external electronic device based on the second frequency band;
wherein the electronic device supports at least one of the first frequency band, the second frequency band, and a third frequency band,
wherein the electronic device controls a conversion among the second frequency band, the first frequency band, and the third frequency band, and
wherein the first frequency band has a coverage larger than that of the second frequency band, and the third frequency band has a coverage larger than that of the first frequency band.

12. The method of claim 11, wherein the determining whether the wireless connection with the at least one external electronic device is possible established comprises:
exchanging synchronization information of the second frequency band with the at least one external electronic device, and determining whether the at least one external electronic device is discovered through the second frequency band based on at least a part of the synchronization information, and
wherein the synchronization information is configured to include at least one piece of information of a discovery channel and a discovery window for discovering.

13. The method of claim 11, wherein the determining whether the at least one external electronic device is discovered comprises performing a low-power discovery based on the second frequency band through a low-power discovery window shared with the at least one external electronic device.

14. The method of claim 11, further comprising:
when the at least one external electronic device is not discovered based on the second frequency band, processing data communication based on the first frequency band, and performing a low-power discovery for discovering the at least one external electronic device based on the second frequency band according to a predetermined period.

15. The method of claim 11, further comprising:
when the at least one external electronic device is discovered based on the second frequency band, establishing a wireless connection with the at least one external electronic device based on the second frequency band; and
selecting at least one wireless connection for data communication from among the wireless connection based on the first frequency band and the wireless connection based on the second frequency band in consideration of a data transmission state.

16. The method of claim 15, further comprising:
when the wireless connection based on the second frequency band is established, disconnecting the wireless connection based on the first frequency band or maintaining the wireless connection based on the first frequency band in a power save state.

17. The method of claim 11, further comprising:
when at least one wireless connection is established from among the wireless connection based on the first frequency band or the wireless connection based on the second frequency band, establishing a wireless connection with a new external electronic device based on the first frequency band or the second frequency band based on whether it is possible to establish the wireless connection with the new external electronic device based on the first frequency band or the second frequency band.

* * * * *